United States Patent [19]
Takahashi

[11] Patent Number: 5,853,847
[45] Date of Patent: Dec. 29, 1998

[54] MAGNETIC RECORDING MEDIUM AND ITS MANUFACTURE

[76] Inventor: Migaku Takahashi, 20-2, Hitokida 2-chome, Taihaku-ku, Sendai-shi, Miyagi-ken 980, Japan

[21] Appl. No.: 591,624

[22] PCT Filed: Jul. 19, 1994

[86] PCT No.: PCT/JP94/01184

§ 371 Date: Jan. 19, 1996

§ 102(e) Date: Jan. 19, 1996

[87] PCT Pub. No.: WO95/03603

PCT Pub. Date: Feb. 2, 1995

[30] Foreign Application Priority Data

Jul. 21, 1993 [JP] Japan ................................. 5-201044
Jan. 24, 1994 [JP] Japan ................................. 6-023326

[51] Int. Cl.$^6$ ........................................................ G11B 5/66
[52] U.S. Cl. .................. 428/141; 428/336; 428/694 T; 428/694 TS; 428/694 TR; 428/694 ST; 428/694 SG; 428/900; 204/192.2; 204/192.35
[58] Field of Search ................................. 428/141, 336, 428/634 T, 634 TS, 634 TR, 634 ST, 900, 694 SG; 204/192.2, 192.35

[56] References Cited

U.S. PATENT DOCUMENTS

| | | | |
|---|---|---|---|
| 5,432,012 | 7/1995 | Lal | 428/610 |
| 5,466,522 | 11/1995 | Freeman | 428/332 |
| 5,607,740 | 3/1997 | Nodo | 428/65.3 |

FOREIGN PATENT DOCUMENTS

| | | |
|---|---|---|
| 62-114124 | 5/1987 | Japan . |
| 62-234237 | 10/1987 | Japan . |
| 2-244421 | 9/1990 | Japan . |
| 3-54723 | 3/1991 | Japan . |
| 4-109430 | 4/1992 | Japan . |

*Primary Examiner*—Leszek Kiliman
*Attorney, Agent, or Firm*—Baker & Daniels

[57] ABSTRACT

An inexpensive high-density recording medium which is increased in coercive force without using expensive ferromagnetic metallic layer. In a magnetic recording medium on the base body of which a ferromagnetic metallic layer is formed on a base body with a metallic underlying layer in between and which utilizes reversal of magnetization, the oxygen concentration in the ferromagnetic metallic layer is 100 wt. ppm or less, and in addition, oxygen concentration in the metallic base layer is also 100 wt. ppm or less. In a method of manufacturing a magnetic recording medium on the base body of which the metallic base layer and ferromagnetic metallic layer are successively formed by sputtering, the impurity concentration of Ar gas used for the formation of the layer is 10 ppb or less. Before forming the metallic base layer, in addition, the surface of the base body is cleaned by high-frequency sputtering using Ar gas the impurity concentration of which is 10 ppb and surface section of the base body is partially removed to a depth of 0.2–1 nm.

34 Claims, 23 Drawing Sheets

× 100,000

× 200,000

(Cr vacuum degree attained : 3.4 × 10⁻⁸ Torr)

x 100,000 x 200,000

(Cr vacuum degree attained : 3.3 x $10^{-7}$ Torr)

MAGNETIC RECORDING MEDIUM AND ITS MANUFACTURE

TECHNICAL FIELD

The present invention relates to a magnetic recording medium and a manufacturing method therefor. In greater detail, the present invention relates to a high density recording medium possessing superior magnetic characteristics which is inexpensive and can be easily produced, as well as to a manufacturing method therefor. The magnetic recording medium in accordance with the present invention is preferably applied to hard disks, floppy disks, magnetic tape, and the like.

BACKGROUND ART

The following technology is known as a conventional magnetic recording medium and a manufacturing method therefor.

FIG. 23 is a schematic diagram showing a hard disk as an example of a magnetic recording medium. In FIG. 23, FIG. 23(a) is a perspective view of the entirety of the magnetic recording medium, while FIG. 23(b) is a cross-sectional view of the section A-A' in FIG. 23(a).

A structure is employed in which a non-magnetic (Ni—P) layer 3 was provided on the surface of an Al substrate 2 which was employed as a base body 1. A Cr base layer 4, a ferromagnetic metallic layer 5, and a protective layer 6 are laminated on this base body 1.

The non-magnetic (Ni—P) layer 3 is formed by means of a plating method or a sputtering method on the surface of an Al substrate 2 which is in the shape of a disk having a diameter of 89 mm (3.5 inch) and a thickness of 1.27 mm (50 mil), and this forms the base body 1. Furthermore, concentric scratches (hereinbelow termed texture) are provided in the surface of the non-magnetic (Ni—P) layer 3 by means of a mechanical grinding process. Generally, the surface roughness of the non-magnetic (Ni—P) layer 3, that is to say, the average center line roughness Ra as measured in the radial direction, is within a range of 5 nm–15 nm. Furthermore, the Cr base layer 4 and the ferromagnetic metallic layer 5 (generally, a Co alloy system magnetic film) are formed on the surface of the base body 1 by means of a plating method, a vapor deposition method, or a sputtering method, and finally, a protective layer comprising carbon or the like which serves to protect the surface of the ferromagnetic metallic layer 5 is provided by means of a sputtering method. The typical thickness of each layer is as follows: the non-magnetic (Ni—P) layer 3 is within a range of 5 $\mu$m–15 $\mu$m, the Cr base layer 4 is within a range of 50 nm–150 nm, the ferromagnetic metallic layer is within range of 30 nm–100 nm, and the protective layer 6 is within a range of 20 nm–50 nm.

In order to apply a high recording density to the medium described above, among the magnetic characteristics of the medium, it is particularly necessary to increase the coercive force. Recently, customer requirements have been shifting from media having a coercive force within a range of 1200 Oe–1600 Oe to media having a coercive force of 1800 Oe or more. The following technologies were known as methods for increasing the coercive force in magnetic recording media which were conventionally considered in order to respond to such needs.

[1] Alterations in the composition of the ferromagnetic metallic layer

[2] Making the crystalline grains of the ferromagnetic metallic layer smaller

[3] Magnetically isolating the crystalline grains of the ferromagnetic metallic layer However, the following problems were present in the conventional technologies described above.

(1) Technology [1] has a large effect when, for example, Pt is included in the ferromagnetic metallic layer. However, the costs thereof are high, and medium noise is also high, so that improvement is expected. With other materials, the effects of the film formation atmosphere are likely to be felt, and it is difficult to realize a coercive force of 1800 Oe or more.

(2) Technology [2] can be realized by reducing, for example, the film thickness of the base layer; however, if the thickness is too greatly reduced, the level of medium noise increases and this is not desirable.

(3) Technology [3] can be realized by utilizing dispersion of the base Cr by means of, for example, high temperature heat processing after film formation; however, the effects of gas emission within the film formation chamber must be considered, and the like, so that the production process becomes complex, and this is undesirable.

The following technologies are known as manufacturing methods for magnetic recording media.

[4] An increase in the base body surface temperature during film formation

[5] Regulation of base body potential

[6] Regulation of film formation gas pressure However, the following problems were present in the conventional technologies described above.

(4) In technology [4], an increase in the amount of gases emitted from the inside of the film formation chamber occurred, and production became unstable, so that this was not desirable.

(5) Technology [5] exhibited no effects even at potentials greater than those conventionally employed, and there was a tendency for a number of abnormal electrical discharges to occur, so that the film formation process was unstable, and this was not desirable.

(6) Technology [6] did not exhibit effects greater than those conventionally obtainable in the range in which discharge was possible (for example, 1 mTorr–30 mtorr).

The current state of (1) above is shown in Table 1. In the case in which the composition of the ferromagnetic metallic layer is altered, which is one method for increasing the coercive force, CoNiCr, CoCrTa, and CoCrPt, for example, are widely employed as the base alloys. Table 1 shows the relative superiority or inferiority of these three alloys with respect to various criteria. The number 1 in the table indicates the most superior of the three alloys.

TABLE 1

| ITEM | CoNiCr | CoCrTa | CoCrPt |
| --- | --- | --- | --- |
| [1] Low cost | 1 | 2 | 3 |
| [2] Relatively uninfluenced by film formation atmosphere | 2 | 3 | 1 |
| [3] Higher coercive force is facilitated (1800 Oe or more) | 3 | 2 | 1 |

TABLE 1-continued

| ITEM | CoNiCr | CoCrTa | CoCrPt |
|---|---|---|---|
| [4]Low level of medium noise | 3 | 1 | 2 |
| [5]Normalized coercive force ($Hc/Hk^{grain}$) is high | 2 | 1 | 2 |

That is to say, CoNiCr is superior with respect to low cost in comparison with the other materials; however, it possesses defects in that there is an upper limit to the coercive force, and the level of medium noise is high. CoCrTa is superior in that the level of medium noise is low and the normalized coercive force is high. However, since it is liable to be affected by the film formation atmosphere, the construction necessary for large scale manufacturing processes is difficult. CoCrPt is characteristic in that a higher coercive force can be produced in comparison with the other materials. However, because the rare metal Pt is employed, the cost is high, and there is also a problem in that the level of medium noise is high in comparison with that of CoCrTa.

Accordingly, there has been a strong desire for the realization of a magnetic recording medium and a manufacturing method therefor which has features such that the material comprising the ferromagnetic metallic layer is low in cost, a high coercive force of 1800 Oe or more can be maintained, and the level of medium noise during recording and playback is low.

The present invention has as an object thereof to provide a magnetic recording medium which realizes a high coercive force using a material which does not contain Pt in the ferromagnetic metallic layer, the materials of which are low in cost, which has a low level of medium noise, and the manufacturing process of which can be simplified.

Furthermore, the present invention has an object thereof to provide a manufacturing method for magnetic recording media which is capable of producing a medium having a high coercive force even when the temperature of the base body surface during film formation is low, and which is capable of employing conventional base body potentials and film formation gas pressures.

DISCLOSURE OF THE INVENTION

The present invention comprises a magnetic recording medium wherein a ferromagnetic metallic layer is formed on the surface of a base body with a metallic base layer in between, and which employs reversal of magnetization, characterized in that the oxygen concentration in the ferromagnetic metallic layer is less than or equal to 100 wtppm.

Furthermore, the magnetic recording medium in accordance with the present invention comprises a magnetic recording medium in which a ferromagnetic metallic layer is formed on the surface of a base body with a metallic base layer in between, and which employs reversal of magnetization, characterized in that an oxygen concentration in the metallic base layer is 100 wtppm or less.

Furthermore, the magnetic recording medium in accordance with the present invention is characterized in that the oxygen concentration in the ferromagnetic metallic layer is 100 wtppm or less.

Furthermore, the magnetic recording medium in accordance with the present invention comprises a magnetic recording medium, wherein a ferromagnetic metallic layer is formed on the surface of a base body, which employs reversal of magnetization, characterized in that an oxygen concentration in the ferromagnetic metallic layer is 100 wtppm or less.

The manufacturing method for magnetic recording media in accordance with the present invention comprises a manufacturing method for magnetic recording media wherein a metallic base layer and a ferromagnetic metallic layer are successively formed by a sputtering method on the surface of a base body, characterized in that the impurity concentration of Ar gas used in film formation is 10 ppb or less. It is further preferable that the impurity concentration of the Ar gas be 100 ppt or less.

The manufacturing method for magnetic recording media in accordance with the present invention is characterized in that prior to forming the metallic base layer, the surface of the base body is subjected to a cleaning process by means of a high frequency sputtering method using Ar gas having an impurity concentration of 10 ppb or less, and 0.2 nm–1 nm is removed.

The manufacturing method for magnetic recording media in accordance with the present invention described above is effective even in the case in which the ferromagnetic metallic layer is formed directly on the surface of the base body.

Furthermore, the base body is characterized in that a non-magnetic layer is formed on the surface thereof.

In the manufacturing method for magnetic recording media in accordance with the present invention, during the formation of the metallic base layer and/or ferromagnetic metallic layer, a negative bias preferably within a range of $-100$ V—$-400$ V is applied to the base body, and it is desirable that the vacuum degree which is achieved be $8 \times 10^{-8}$ Torr or less. It is further preferable that the surface temperature of the base body be within a range of 60° C.–150° C.

The manufacturing method for magnetic recording media in accordance with the present invention which is described above is effective even in the case in which the surface roughness Ra of the base body is 3 nm or less. Furthermore, the method can also be applied to cases in which the gas which is used during the formation of the metallic base layer and/or ferromagnetic metallic layer is ($Ar+N_2$) or ($Ar+H_2$).

Function

In the present invention, in a magnetic recording medium in which a ferromagnetic metallic layer is formed on the surface of a base body with a metallic base layer in between, by keeping the oxygen concentration in the ferromagnetic layer at 100 wtppm or lower, there are few grains which have impurities as a nucleus thereof and which precipitate crystal growth, so that a uniform crystal grain can be obtained, and it is possible to realize a magnetic recording medium having high coercive force in a direction parallel to the film surface.

Furthermore, in the present invention, in a magnetic recording medium in which a ferromagnetic layer is formed on the surface of a base body with a metallic base layer in between, the oxygen concentration of the metallic base layer, which comprises Cr and the like, is maintained at a level of 100 wtppm or less, and thereby, good crystal growth is possible even when the film is thin. As a result, the degree of control of the oriented surfaces of the crystal grains comprising the ferromagnetic metallic layer (that is to say, the extent to which the C axis of the hcp structure lies in the film surface) increases, so that it is possible to realize a magnetic recording medium having a high coercive force in a direction parallel to the film surface.

Furthermore, in the present invention, in a magnetic recording medium in which a ferromagnetic metallic layer is formed on the surface of a base body with a metallic base layer in between, by means of maintaining the oxygen concentration in the ferromagnetic metallic layer and the metallic base layer at 100 wtppm or less, the non-magnetic Cr of the metallic base layer passes through the boundary between the two layers and is easily dispersed between the crystal grains of the ferromagnetic metallic layer without being affected by the impurities present in the ferromagnetic metallic layer and the metallic base layer. As a result, the degree of magnetic isolation of each crystal grain of the ferromagnetic metallic layer increases, so that it is possible to realize a magnetic recording medium having a high coercive force in a direction parallel to the film surface.

In the magnetic recording medium in accordance with the present invention, the thickness of the magnetic base layer is preferably within a range of 2.5 nm–100 nm, and is more preferably within a range of 5 nm–30 nm, and thereby a high coercive force and a low level of medium noise can be simultaneously realized.

In the magnetic recording medium in accordance with the present invention, the thickness of the ferromagnetic metallic layer is preferably within a range of 2.5nm–40 nm, and more preferably within a range of 5 nm–20 nm, and thereby, it is possible to realize a still higher coercive force.

Furthermore in the present invention, in a magnetic recording medium in which a ferromagnetic metallic layer is formed on the surface of a base body, by means of maintaining the oxygen concentration in the ferromagnetic metallic layer at 100 wtppm or less, there are few grains which have impurities as a nucleus thereof and which precipitate crystal growth, so that uniform crystal grains are obtainable even in thin film regions of 30 nm or less, and it is possible to realize a magnetic recording medium having a high coercive force in a direction perpendicular to the film surface.

In the magnetic recording medium in accordance with the present invention, by means of maintaining the surface roughness Ra of the base body preferably at level of 3 nm or less, and more preferably at a level of 1 nm or less, it is possible to realize a still higher coercive force.

In the magnetic recording medium in accordance with the present invention, the normalized coercive force of the ferromagnetic metallic layer (indicated by $Hc/Hk^{grain}$) is 0.3 or more and less than 0.5, so that it is possible to realize a still lower level of medium noise.

In the magnetic recording medium in accordance with the present invention, Al alloy, glass, or silicon are preferably employed as the base body material, since the surface roughness described above is thus realizable at a low cost.

In the present invention, the magnetic recording medium is produced by successively forming a metallic base layer and a ferromagnetic metallic layer by means of a sputtering method on the surface of a base body; what is meant by "successively" is that after the formation of the metallic base layer, and until the formation of the ferromagnetic metallic layer on the surface thereof, the layer is not exposed to an atmosphere having a pressure equal to or greater than the gas pressure during film formation. Using this meaning, by means of maintaining the impurity concentration of the Ar gas which is used during the successive formation of the metallic base layer and the ferromagnetic metallic layer at a level of 10 ppb or less, and preferably at a level of 100 ppt or less, it is possible to realize a manufacturing method for magnetic recording media which is capable of reducing the oxygen concentration contained in each layer described above.

Accordingly, the targets which are employed in the formation of the metallic base layer and ferromagnetic metallic layer contain amounts of oxygen of, respectively, 150 ppm or less and 30 ppm or less, and in order to maintain high purity of the atmosphere during film formation, it is desirable that the vacuum degree attained in the film formation chamber be $8 \times 10^{-8}$ Torr or less.

Furthermore, in the present invention, prior to forming the magnetic base layer, the surface of the base body is subjected to a cleaning process by means of high frequency sputtering using Ar gas having an impurity Concentration of 10 ppb or less, and by means of extremely shallow stripping to a depth of 0.2 nm–1 nm, it is possible to realize a manufacturing method for magnetic recording media having the following two functions.

(1) It is possible to remove substances which adhere to the surface of the base body and which can not be removed by vacuum storage or heat processing, so that it is possible to promote the crystal growth of the Cr film from the stage at which the Cr layer is thin (for example, 5 nm) As a result, even if a ferromagnetic metallic layer is formed on the thin Cr layer, it is possible to obtain a high coercive force parallel to the film surface.

(2) The dispersion of non-magnetic Cr from the Cr layer to the crystal grain boundaries of the ferromagnetic metallic layer formed on the Cr layer is facilitated. As a result, each crystal grain forming the ferromagnetic metallic layer becomes more resistant to magnetic interaction from adjoining crystal grains, and a high coercive force can be obtained in a direction parallel to the film surface.

The above two functions, that is to say, the impurity concentration of the Ar gas and the cleaning processing with respect to the surface of the base body, exhibit identical effects even in the case in which a ferromagnetic metallic layer is formed directly on the surface of the base body.

The effect of the cleaning processing described above is exactly opposite to the effect which would be predicted from etching by means of a common sputtering method in magnetic recording media; this was discovered for the first time by means of the present invention. That is to say, cleaning using a high frequency sputtering method with respect to the surface of the (Ni—P) layer which employed a common method was intended to remove solely the surface region of the (Ni—P) layer, and thus to increase the adhesion strength of the thin film formed thereon, as disclosed in, for example, Japanese Patent Application, First Publication, No. Sho 64-70925, and the striping depth was as much as 1 nm–20 nm. Moreover, it was disclosed that by means of this method, the crystalline orientation of the Cr base layer which was formed was altered, and the coercive force of the medium was reduced. For this reason, after the cleaning processing had been carried out, it was necessary to undertake an additional oxidation process which lasted anywhere from somewhat less than 100 seconds to a number of hours and was complicated, so that productivity precipitously declined. As described above, the present invention makes it possible to mass produce with good productivity a magnetic recording medium having extremely superior magnetic characteristics, by means of executing a cleaning process removing 1 nm or less using Ar gas having a low impurity concentration.

Furthermore, in the present invention, it is preferable that the cleaning rate when high frequency sputtering is used be within a range of 0.001 nm/sec–0.1 nm/sec; within this range, it is possible to stably obtain a magnetic recording medium having a high coercive force.

Furthermore, when the metallic base layer and/or the ferromagnetic metallic layer is formed, the coercive force can be further increased by applying a negative bias to the base body. It is particularly preferable that this bias value be within a range of −100 V–−400 V.

Furthermore, in the present invention, even when the surface temperature of the base body during the formation of the metallic base layer and/or the ferromagnetic metallic layer is within a range of 60° C.–150° C., it is possible to realize a coercive force which was conventionally only obtainable at temperatures of 250° C. or more. As a result, manufacturing can be conducted using a heating process at a lower temperature than that which was conventionally employed. The amount of gas released from the interior of the film formation chamber can be reduced, and plastics and the like which are susceptible to high heat may also be employed as base body materials.

Embodiment Modes

Hereinbelow, embodiment modes of the present invention will be explained.

(Base Body)

Examples of base bodies include, for example, aluminum, titanium or alloys thereof, silicon, glass, carbon, ceramics, plastics, resins, and compound materials thereof, and base bodies in which a non-magnetic film of a different substance has been coated on the surface of one of these materials by means of a sputtering method, a vapor deposition method, a plating method, or the like. It is preferable that the non-magnetic film which is provided on the surface of the base body not be subject to magnetization at high temperatures, be conductive, and be easily mechanically worked, while possessing the appropriate degree of surface hardness. Especially preferable as a base body which fulfills such conditions is a base body in which a (Ni—P) layer is provided as a non-magnetic film on the surface of an aluminum alloy.

With respect to the shape of the base body, for the purposes of use as a disk, a doughnut-shaped circular base body may be employed. A base body having the magnetized layers and the like described hereinbelow provided thereon, that is to say, a magnetic recording medium, is used while being rotated at, for example, a speed of 3600 rpm about the center of the circular base body during magnetic recording and playback. At this time, a magnetic head rides above the magnetic recording medium at a height of approximately 0.1 μm. Accordingly, with regards to the base body, it is necessary to appropriately control the surface flatness, the parallel nature of the front and back surfaces, undulation in the circumferential direction of the base body, and the surface roughness.

Furthermore, when the base body is rotated or stopped, the surface of the magnetic recording medium and the magnetic head come into contact and rub against one another (Contact Start Stop, termed CSS). As a counter measure, there are cases in which concentric slight scratches (texture) are provided in the surface of the base body.

(Metallic Base Layer)

Examples of the metallic base layer include, for example, Cr, Ti, W and alloys thereof. When alloys are employed, combinations with, for example, V, Nb, and Ta and the like are proposed. In particular, Cr is widely employed in mass production, and the sputtering method and the vapor deposition method and the like are employed as film formation methods.

The role of this metallic base layer is to promote crystal growth of the ferromagnetic metallic layer so that, when the ferromagnetic metallic layer comprising Co groups is provided on the metallic base layer, the magnetization easy axis of the ferromagnetic metallic layer lies along a direction within the base body surface; that is to say, the coercive force in a direction within the base body surface increases.

If a metallic base layer comprising Cr is produced by a sputtering method, then film growth factors controlling the crystalline nature thereof include, for example, the surface temperature of the base body, the gas pressure during film formation, the bias applied to the base body, the thickness of the film formed, and the like. In particular, the coercive force of the ferromagnetic metallic layer exhibits a tendency to increase in proportion to the thickness of the Cr film, so that a Cr film thickness within a range of 50 nm–150 nm is employed.

In order to increase the recording density, it is necessary to reduce the height at which the magnetic head rides above the surface of the medium. If the thickness of the Cr film described above is large, there is a tendency for the surface roughness of the medium also to increase. Accordingly, it is desirable to realize a high coercive force using a thin Cr film.

(Ferromagnetic Metallic Layer)

An example of the ferromagnetic metallic layer is, for example, a Co group alloy containing at least Co.

If the ferromagnetic metallic layer is provided on the surface of the base body with a metallic base layer in between (that is to say, in the case of a magnetic film for recording within the surface), examples include, for example, CoNiCr, CoCrTa, CoPtCr, CoPtNi, CoNiCrTa, CoPtCrTa, and the like. In particular, CoNiCr has a low cost and is relatively unaffected by the film formation atmosphere, CoCrTa has a low level of medium noise, and the CoPt systems are capable of realizing coercive forces of 1800 Oe or more, which are difficult to produce using CoNiCr or CoCrTa, so that these are preferably employed. In order to increase the recording density, and to reduce the manufacturing costs, the development of a ferromagnetic metallic layer having low material costs, a low level of medium noise, and which is capable of realizing a high coercive force, has been desired.

On the other hand, in the case in which the ferromagnetic metallic layer is provided directly on the surface of the base body without a metallic base layer in between (that is to say, in the case of a magnetic layer used for perpendicular recording), examples include, for example, CoCr, CoPt, CoCrTa, and the like. Furthermore, there are cases in which a soft magnetic metallic layer is provided as a backing layer beneath the ferromagnetic metallic layer. The establishment of materials and manufacturing methods which, in such cases, make it possible to maintain a high coercive force in a direction perpendicular to the film surface even when the ferromagnetic metallic layer is thin, have been desired.

(Magnetic Recording Medium Employing Reversal of Magnetization)

There are two types of magnetic recording medium which employ reversal of magnetization: a medium in which recording magnetization is formed parallel to the film surface of the ferromagnetic metallic layer described above (in-surface magnetic recording medium) and a medium in which recording magnetization is formed perpendicularly (perpendicular magnetic recording medium).

In both media, in order to increase the recording density, it is necessary to provide for a further reduction in size of the recording magnetization. In this reduction in size, the leakage flux of each recording magnetization is reduced, so that the playback signal output in the magnetic head is reduced in size. Accordingly, a further reduction in the level of magnetic noise, which is thought to result from the influence of adjacent recording magnetizations, is desired.

(Oxygen Concentration in the Ferromagnetic Metallic Layer)

It is known that the oxygen concentration in the ferromagnetic metallic layer, for example, in the case of a CoNiCr film produced by means of the conventional sputtering method, is 250 wtppm or more. Research related to the effect of the oxygen concentration in the ferromagnetic metallic layer, that is to say, the influence with respect to the coercive force of the medium or the medium noise, has been desired.

What is meant by the conventional sputtering method described above is film formation under conditions such that the vacuum degree attained within the film formation chamber in which the ferromagnetic metallic layer is formed is within a range of $1 \times 10^{-7} - 5 \times 10^{-7}$ Torr, and the impurity concentration of the Ar gas used when forming the ferromagnetic metallic layer is 1 ppm or more.

(Oxygen Concentration in the Metallic Base Layer)

With respect to the oxygen concentration in the metallic base layer, it is known that, for example, in the case of the Cr film produced by means of the conventional sputtering method, this concentration is 250 wtppm or more. Investigations with respect to the influence of the oxygen concentration in the metallic base layer, that is to say, the influence on the crystal growth process depending on the thickness of the metallic base layer, the influence on the ferromagnetic metallic layer formed on the metallic base layer, and the like, have been desired.

The meaning of the conventional sputtering method described above is identical to that given under the heading "Oxygen Concentration in the Ferromagnetic Metallic Layer" above.

(Normalized Coercive Force of the Ferromagnetic Metallic Layer (indicated by $Hc/Hk^{grain}$))

What is meant by the normalized coercive force of the ferromagnetic metallic layer is the value resulting when the coercive force Hc is divided by the anisotropic field $Hk^{grain}$ of the crystal grain, and this value expresses the extent to which the magnetic isolation of the crystal grains increases; this is disclosed in "Magnetization Reversal Mechanism Evaluated by Rotational Hysteresis Loss Analysis for the Thin Film Media," Migaku Takahashi, T. Shimatsu, M. Suekane, M. Miyamura, K. Yamaguchi and H. Yamasaki: IEEE TRANSACTIONS ON MAGUNETICS, VOL. 28, 1992, pp. 3285.

The normalized coercive force of ferromagnetic metallic layers produced by a conventional sputtering method was smaller than 0.3, insofar as the ferromagnetic metallic layers comprised Co groups. In accordance with the Stoner-Wohlfarth theory, when the crystal grains are completely magnetically isolated, a value of 0.5 is indicated, and this value represents the upper limit of the normalized coercive force.

Furthermore, in J. -G. Zhu and H. N. Bertram: Journal of Applied Physics, VOL. 63, 1988, pp. 3248, it is stated that when the normalized coercive force of the ferromagnetic metallic layer is high, the magnetic interaction of the various crystal grains comprising the ferromagnetic metallic layer is reduced, and it is possible to realize a high coercive force.

Here, what is meant by coercive force Hc is the coercive force of the medium obtained from the magnetization curve measured using a variable sample magnetometer (termed VSM). The anisotropic field $Hk^{grain}$ of the crystal grain indicates the applied magnetic field at which the rotational hysteresis loss measured using a highly sensitive torque magnetometer completely disappears. The coercive force and the anisotropic field represent values measured within the plane of the film surface in the case of a magnetic recording medium in which a ferromagnetic metallic layer is formed on the surface of a base body with a metallic base layer in between, and represent values measured in a direction perpendicular to the film surface in the case of a magnetic recording medium in which a ferromagnetic metallic layer is formed on the surface of a base body.

(Aluminum Alloy)

Examples of an aluminum alloy include, for example, an alloy comprising aluminum and magnesium. Presently, disks employing an aluminum alloy as a base body are the most widely employed in HD (hard disk) uses. Since the purpose of use is magnetic recording, it is preferable that little metallic oxide be contained.

Furthermore, there are a number of cases in which a (Ni—P) film, which is non-magnetic, is provided on the surface of the aluminum alloy by means of a plating method or sputtering method. The purpose of this is to increase corrosion resistance and to increase the surface hardness of the base body. In order to reduce the frictional force produced when the magnetic head rubs against the surface of the medium, slight concentric scratches (texture) are provided in the surface of this (Ni—P) film.

The problems involved in the case in which an aluminum alloy is used as the base body are making the base body thin and reducing the surface roughness of the base body. Currently, the former has a limit of 0.5 mm, while the latter has a limit of approximately 0.5 nm.

(Glass)

Examples of the glass include, for example, glass which has been strengthened by means of conducting iron doping with respect to the glass surface, glass in which the glass itself comprises a microcrystalline structure, and the like. Both have thus been treated so as to eliminate the drawback of glass, that it is easy to break.

The surface hardness of glass is high in comparison with that of aluminum alloy, so that glass is superior in that it is not necessary to provide a (Ni—P) film or the like; furthermore, it is also advantageous from the point of view of the thinning of the base body, the smoothing of the base body surface, and the high temperature resistance characteristics of the base body.

However, in order to produce a magnetic film having a high coercive force, it is preferable to set the surface temperature of the base body during film formation to a high temperature and to conduct film formation while applying a bias with respect to the base body, so that there are cases in which a non-magnetic layer is provided on the surface of the glass. Furthermore, in order to prevent the entry of harmful elements from the glass into the magnetic film, there are cases in which a non-magnetic layer is disposed. Alternatively, there are cases in which, in order to reduce the frictional force when the magnetic head rubs against the base body surface, a non-magnetic layer having a fine irregular surface is disposed on the surface of the glass.

The problems to be solved when glass is used as the base body are the thinning of the base body and techniques to prevent base body breakage.

(Silicon)

Examples of silicon include, for example, silicon wafers, which have a history of use in the semiconductor field, which are formed into a disc shape.

As with glass, the surface hardness of silicon is high, and the thinning of the base body is possible; the smoothness of the base body is also high, and the high temperature resistance characteristics of the base body are good, so that silicon is superior to aluminum alloy. In addition, the crystal orientation and the lattice constant of the base body surface can be selected, so that an improvement in the controllability of the crystal growth of the magnetic film formed thereon is expected. Furthermore, as with the aluminum alloy, the base body possesses conductivity, so that it is possible to apply a bias to the base body, and emission of gases such as $H_2O$ and the like from the interior of the base body is small, so that this is advantageous from the point of view of achieving greater cleanliness in the film formation areas.

The problems to be solved in the case in which silicon is employed as the base body are, as in the case of glass, the thinning of the base body and techniques for preventing the breakage of the base body.

(Sputtering Method)

Examples of the sputtering method include, for example, the conveyed type, in which a thin film is formed while moving the base body in front of the target, and the stationary type, in which the base body is fixed in front of the target and a thin film is formed. Since the productivity of the former is high, it is advantageous for low cost production of media, while with the latter type, the angle of incidence of the sputtered grain with respect to the base body is stable, so that it is possible to manufacture base bodies which have superior recording and playback characteristics.

(Successive Formation of the Metallic Base Layer and the Ferromagnetic Metallic Layer)

What is meant by the successive formation of the metallic base layer and the ferromagnetic metallic layer is that "after the formation of the metallic base layer on the surface of the base body, and until the formation of the ferromagnetic metallic layer on the surface thereof, the surface is not exposed to an atmosphere having a pressure equal to or higher than the gas pressure during film formation." It is known that when a ferromagnetic metallic layer is formed on the surface of the metallic base layer after the surface has been exposed to the atmosphere, the coercive force of the medium declines precipitously (for example, from 1500 Oe without exposure to 500 Oe or less when exposed).

(Impurities Present in the Ar Gas Used in Film Formation and the Concentration Thereof)

Examples of impurities which are present in the Ar gas used in film formation include, for example, $H_2O$, $O_2$, $CO_2$, $H_2$, $N_2$, $C_xH_y$, and the like. The impurities which particularly influence the amount of oxygen incorporated in the film are thought to be $H_2O$, $O_2$, and $CO_2$. Accordingly, the impurity concentration in the present invention will be expressed as the sum of the $H_2O$, $O_2$, and $CO_2$ contained in the Ar gas which is used in film formation.

(Cleaning Processing by a High Frequency Sputtering Method)

Examples of cleaning processing by means of a high frequency sputtering method include, for example, the method in which an alternating voltage from a RF (radio frequency, 13.56 MHZ) power source is applied to a base body which is placed within an area having a gas pressure permitting discharge. The advantage of this method is that it can also be applied in cases in which the base body is non-conductive. In general, the effect of cleaning processing is to increase the ability of the thin film to adhere closely to the base body. However, there are many unclear points with respect to the effects on the film quality of the thin film itself which is formed on the surface of the base body after cleaning processing.

(Impurities in the Cr Target Used During the Formation of the Metallic Base Layer and the Concentration Thereof)

Examples of impurities in the Cr target used during the formation of the metallic base layer include, for example, Fe, Si, Al, C, O, N, H, and the like. The impurity which is thought to particularly effect the amount of oxygen incorporated into the film is O. Accordingly, the impurity concentration in the present invention is indicated by the oxygen contained in the Cr target which is used during the formation of the metallic base layer.

(Impurities in the Target Used During the Formation of the Ferromagnetic Metallic Layer and the Concentration Thereof)

Examples of impurities in the Co group target used during the formation of the ferromagnetic metallic layer include, for example, Fe, Si, Al, C, O, N, and the like. The impurity which is thought to particularly affect the amount of oxygen incorporated into the film is O. Accordingly, the impurity concentration in the present invention is indicated by the oxygen contained in the target used during the formation of the ferromagnetic metallic layer.

(Application of a Negative Bias to the Base Body)

The application of a negative bias to the base body indicates the application of a direct current bias voltage with respect to the base body during the formation of a Cr base film or a magnetic film as a magnetic recording medium. It is known that if an appropriate bias voltage is applied, the coercive force of the medium is increased. It is commonly known that the effect of the bias application described above is greater when a bias is applied in the case of both layers than in the case in which the bias is applied during the execution of only one or the other of the layers.

(Vacuum Degree Attained in the Film Formation Chamber in which the Metallic Base Layer and/or the Ferromagnetic Metallic Layer is Formed)

The vacuum degree attained in the film formation chamber in which the metallic base layer and/or ferromagnetic metallic base layer is formed is one film growth factor affecting the value of the coercive force, depending on the material of the ferromagnetic metallic layer. In particular, when Co group material in which Ta is contained in the ferromagnetic metallic layer is used, the effect is large when the vacuum degree attained is low (for example, in the case of a vacuum degree of $5 \times 10^{-6}$ Torr or more).

(Surface Temperature of the Base Body During the Formation of the Metallic Base Layer and/or the Ferromagnetic Metallic Layer)

The surface temperature of the base body during the formation of the metallic base layer and/or the ferromagnetic metallic layer is one film growth factor which affects the value of the coercive force independently of the material of the ferromagnetic metallic layer. The higher the surface temperature at which film formation is conducted, the higher the coercive force which can be realized, within such a range that the base body is not damaged. What is meant by damage to the base body is external changes such as warping, swelling, cracking, or the like, and internal changes, such as magnetization, an increase in the amount of gas emitted, and the like.

(Surface Roughness Ra of the Base Body)

Examples of the surface roughness of the base body include, for example, the average center line roughness Ra in the case in which the surface of a disc shaped base body is measured in a radial direction. The TALYSTEP produced by RANKTAYLORHOBSON Co. was used as the measuring instrument.

When base body rotation is initiated from a stopped state, or vice versa, the surfaces of the magnetic recording medium and the magnetic head come into contact and rub against one another (Contact Start Stop, termed CSS). At this time, in order to suppress the adhesion of the magnetic head and an increase in the coefficient of friction, is preferable that Ra be large. On the other hand, when the maximum rotational frequency of the base body is reached, it is necessary to maintain a gap between the magnetic recording medium and the magnetic head, that is to say, to maintain the distance at which the magnetic head rides above the medium, so that it is desirable that Ra be small.

Accordingly, the maximum and minimum values of the surface roughness Ra of the base body are appropriately determined from the specifications required with respect to the magnetic recording medium, for the reasons described above. For example, when the height at which the magnetic head rides above the medium is 2 μinch, Ra should be within a range of 6 nm–8 nm.

(Texture Processing)

Examples of texture processing include, for example a method employing mechanical grinding, a method employing chemical etching, and a method employing the provision of a physically irregular film. In particular, when an aluminum alloy base body, which is most widely employed, is used as the base body of the magnetic recording medium, a mechanical grinding method is adopted. For example, a method is employed in which tape, having on the surface thereof abrasive grain used for grinding, is applied to the (Ni—P) film provided on the surface of an aluminum alloy base body while this base body is rotating, and thereby slight concentric scratches are created. When using this method, there are cases in which the abrasive grain used for grinding is employed so as to be free of the tape.

(Composite Electrolytic Polishing Processing)

Examples of composite electrolytic polishing processing include, for example, processing which provides an oxide passivated film, having chromium oxide as a product thereof, on the inner walls of a vacuum chamber used during the formation of a magnetic film or the like. In this case, SUS316L or the like is preferable for use as the material comprising the inner walls of the vacuum chamber. By means of this processing, the amount of $O_2$ and $H_2O$ released from the inner walls of the vacuum chamber can be reduced, so that it is possible to further reduce the amount of oxygen incorporated into the thin film which is produced.

In the magnetron sputtering apparatus (model number ILC3013: load-lock style stationary opposition type) produced by Aneruba Co. which was used in the present invention, the inner walls of all the vacuum chambers (the load/extraction chamber, the film formation chambers, and the cleaning chamber) were subjected to the processing described above.

(Description of the References)

Figure 1:
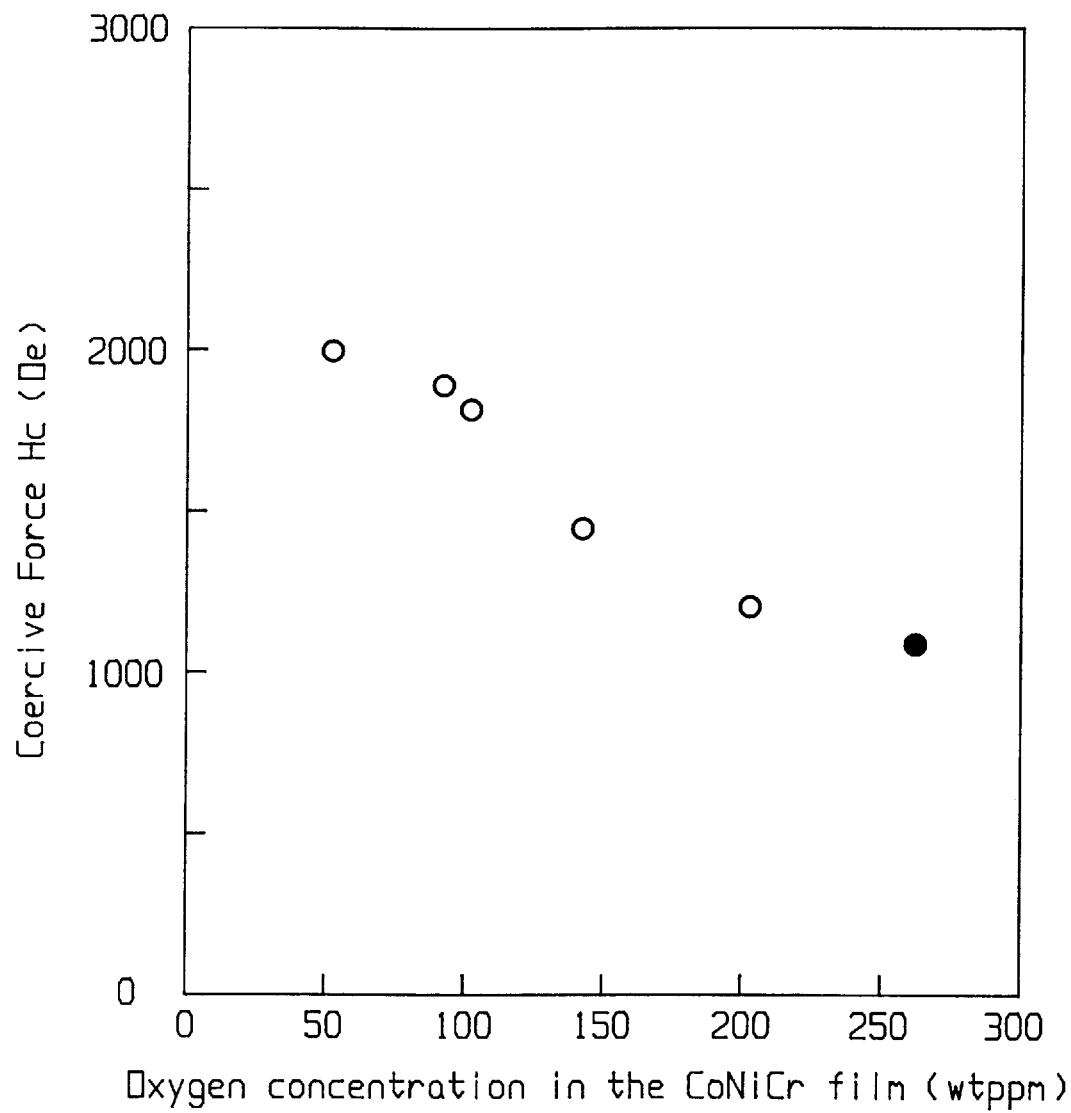
FIG. 1 is a graph showing the relationship between the oxygen concentration in a CoNiCr film in accordance with Embodiment 1 and the coercive force of the medium produced.

1. Al substrate,
2. magnetic (Ni—P) layer,
3. Cr base layer,
4. ferromagnetic metallic layer,
5. protective film.

BEST MODE FOR CARRYING OUT THE INVENTION

Hereinbelow, the present invention will be explained in detail using Embodiments; however, the present invention is no way limited to these Embodiments.

(Embodiment 1)

In the present Embodiment, the effects of limiting the oxygen concentration contained in the ferromagnetic metallic layer in a magnetic recording medium in which a ferromagnetic metallic layer is formed on the surface of a base body with a metallic base layer in between will be explained. In order to confirm these effects, film formation was conducted while varying the impurity concentration contained in the Ar gas during the formation of the ferromagnetic metallic layer within a range of 10 ppb–1 ppm. At this time, the impurity concentration contained in the Ar gas during formation of the metallic base layer was fixed at 1 ppm.

The sputtering apparatus which was used in producing the medium in the present Embodiment was a magnetron sputtering apparatus (model number ILC3013: load-lock style stationary opposition type) produced by Aneruba Co., and the inner walls of all the vacuum chambers (the load/extraction chamber (combined with the cleaning chamber), film formation chamber 1, film formation chamber 2, and film formation chamber 3) were subjected to composite electrolytic polishing processing. Table 1 shows the film formation conditions during the execution of the magnetic recording media of the present invention.

TABLE 2

| ITEM | SET VALUES |
|---|---|
| [1] Base Body material | Al-Mg alloy (provided with a 10 μm thick (Ni-P) plated film) |
| [2] Base Body diameter and shape | 89 mm, disc-shaped |
| [3] Base Body surface form | Textured, Ra = 5 nm |
| [4] Attained vacuum degree (Torr) | $5 \times 10^{-7}$ (same in all chambers) |
| [5] Impurity concentration in the Ar gas | 10 ppb - 1 ppm (film formation chamber 2) 1 ppm (other than film formation chamber 2) |
| [6] Ar gas pressure (mTorr) | 2 (same in all chambers) |
| [7] Base Body surface temperature maintained (°C.) | 250 (same in all chambers) |
| [8] Target material (at %) | Cr, $Co_{62.5}Ni_{30}Cr_{7.5}$, C |
| [9] Target diameter (inch) | 6 |
| [10] Impurity concentration in target (ppm) | 120 (Cr), 20 (CoNiCr) |
| [11] Distance between target and base body (mm) | 35 (Cr, CoNiCr, C) |
| [12] Power applied to target (W) | Direct current, 200 (Cr, CoNiCr) Direct current, 400 (C) |
| [13] Direct current bias applied to base body during film formation (-Volt) | 200 (Cr), 300 (CoNiCr), 0 (C) |
| [14] Film thickness produced (nm) | 50 (Cr), 40 (CoNiCr), 20 (C) |

Hereinbelow, the production method for magnetic recording media in accordance with the present Embodiment will be explained in order of the processes involved. The numbers in parentheses below indicate this order.

(1) An aluminum alloy base body having a disk shape, such that the inner and outer radiuses were 25 mm and 89 mm and the thickness was 1.27 mm, was used as a base body. An (Ni—P) film having a thickness of 10 μm was provided by means of a plating method on the surface of the aluminum alloy substrate. Slight concentric scratches (texture) were provided on the surface of the (Ni—P) film by means of a mechanical method, and the surface roughness of the base body when scanned in the radial direction of the disk was such that the average center line roughness Ra was 5 nm.

(2) The base body described above was subjected, prior to the film formation described hereinbelow, to a cleaning process by means of mechanical and chemical methods, and a drying process using hot air and the like.

(3) After the completion of the drying process described above, the material was set in a base body holder comprising aluminum which was placed in the load chamber of the sputtering apparatus. After the interior of the load chamber was evacuated to an attained vacuum degree of $1\times10^{-7}$ Torr by means of a vacuum exhaust apparatus, the base body was subjected to a heating process using an infrared lamp at a temperature of 250° C. and for a period of five minutes.

(4) The base body holder described above was moved from the load chamber to the film formation chamber 1 for Cr film production. After being moved, the base body was maintained at a temperature of 250° C. using an infrared lamp. However, the film formation chamber 1 was evacuated in advance to an attained vacuum degree of $3\times10^{-9}$ Torr, and after moving the base body holder, the door valve between the load chamber and film formation chamber 1 was closed. The impurity concentration of the Cr target which was employed was 120 ppm.

(5) Ar gas was introduced into film formation chamber 1, and the gas pressure of film formation chamber 1 was set to 2 mTorr. The impurity concentration contained in the Ar gas which was used was fixed at 1 ppm.

(6) A voltage of 200 W was applied to the Cr target from a direct current power source and a plasma was generated. As a result, the Cr target was caused to sputter, and a Cr layer having a thickness of 50 nm was formed on the surface of the base body which was in a position of parallel opposition to the target.

(7) After forming the Cr layer, the base body holder was moved from film formation chamber 1 to the film formation chamber 2 for CoNiCr film production. After being moved, the base body was maintained at a temperature of 250° C. by means of an infrared lamp. Film formation chamber 2 was evacuated to an attained vacuum degree of $3\times10^{-9}$ Torr, and after the base body holder was moved, the door valve between film formation chamber 1 and film formation chamber 2 was closed. The target composition which was used was 62.5 at % Co, 30 at % Ni, and 7.5 at % Cr, and the impurity concentration of the target was 20 ppm.

(8) Ar gas was introduced into film formation chamber 2 and the gas pressure of film formation chamber 2 was set to 2 mTorr. The impurity concentration contained in the Ar gas which was employed was varied within a range of 10 ppb–1 ppm.

(9) A voltage of 200 W was applied to the CoNiCr target from a direct current power source, and a plasma was generated. As a result, the CoNiCr target was caused to sputter, and a CoNiCr layer having a thickness of 40 nm was formed on the surface of the base body coated with a Cr layer, which was in a position of parallel opposition to the target.

(10) After the CoNiCr layer was formed, the base body holder was moved from film formation chamber 2 to film formation chamber 3 for C film production. After being moved, the base body was maintained at a temperature of 250° C. by means of an infrared lamp. Film formation chamber 3 was evacuated in advance to an attained vacuum degree of $3 \times 10^{-9}$ Torr, and after the base body holder was moved, the door valve between film formation chamber 2 and film formation chamber 3 was closed.

(11) Ar gas was introduced into film formation chamber 3, and the gas pressure in film formation chamber 3 was set to 2 mTorr. The impurity concentration contained in the Ar gas which was employed was fixed at 1 ppm.

(12) A voltage of 400 W was applied to the C target from a direct current power source and a plasma was generated. As a result, the C target was caused to sputter, and a C layer having a thickness of 20 nm was formed on the surface of the base body, which was provided with a CoNiCr and a Cr layer, and which was in a position of parallel opposition to the target.

(13) After the C layer was formed, the base body holder was moved from film formation chamber 3 to the extraction chamber. After this, $N_2$ gas was introduced into the extraction chamber, and after the pressure was returned to atmospheric pressure, the base body was removed. By means of processes (1)–(12) described above, a magnetic recording medium having a C/CoNiCr/Cr/NiP/Al structure was produced.

Targets were employed in which the presence of impurities was strictly suppressed. The amounts of impurities in the target used for Cr formation were as follows: Fe:88, Si:34, Al;10, C:60, O:120, N:60, H:1.1 (wtppm). Furthermore, the composition of the target used for ferromagnetic metallic layer formation was Ni:29.2 at %, Cr:7.3 at %, and Co: bal. The impurities were as follows: Fe:27, Si<10, Al<10, C:30, O:20, and N>10 (wtppm).

In FIG. 1, the magnetic characteristics of the medium which was produced are indicated by a white circle. The horizontal axis in FIG. 1 indicates the oxygen concentration in the CoNiCr film. The measurement of this oxygen concentration was conducted by means of SIMS. The vertical axis in FIG. 1 indicates the coercive force Hc in the circumferential direction of the sample at this time.

Conventionally, the impurity concentration present in the Ar gas which was employed during the formation of a ferromagnetic metallic layer comprising CoNiCr was 1 ppm. Furthermore, the oxygen concentration present in the CoNiCr layer in a conventional medium was 260 wtppm, and the coercive force of a conventional medium is indicated in FIG. 1 by a black circle.

In the present Embodiment, as shown in FIG. 1, by maintaining the oxygen concentration present in the CoNiCr film at a level of 100 wtppm or below, the coercive force increased dramatically, and a level of 90 wtppm or below was particularly advantageous. It was separately observed that the saturation magnetization values at this time were essentially constant.

Figure 2A:
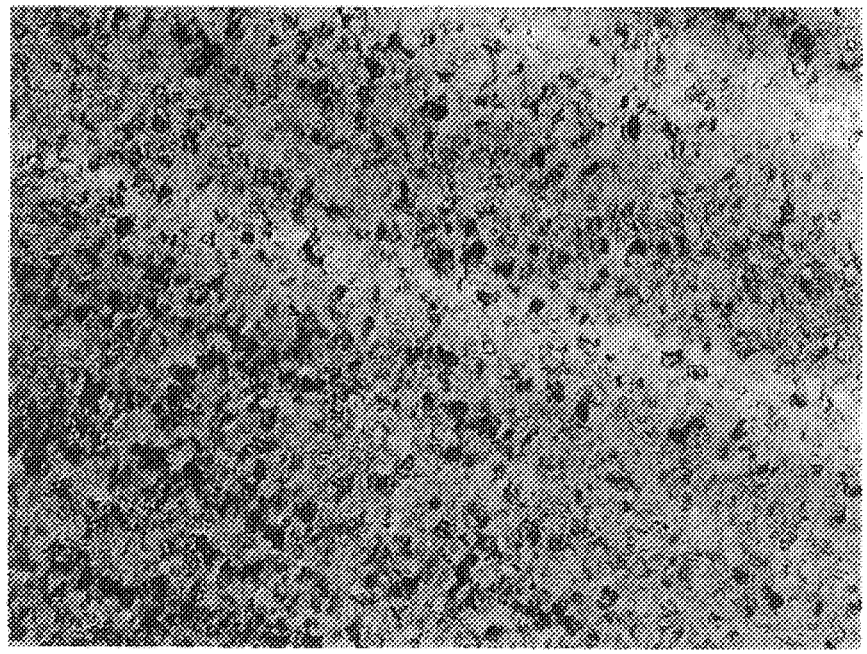
FIG. 2 is an image of the surface of a magnetic recording medium taken by a transmission electron microscope (TEM).
Figure 2B:
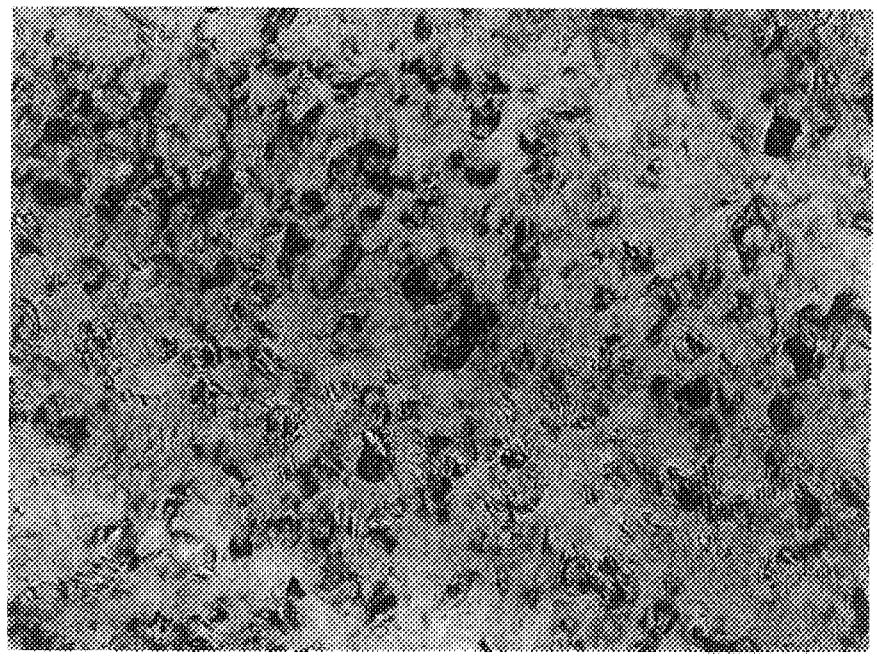
Figure 3A:
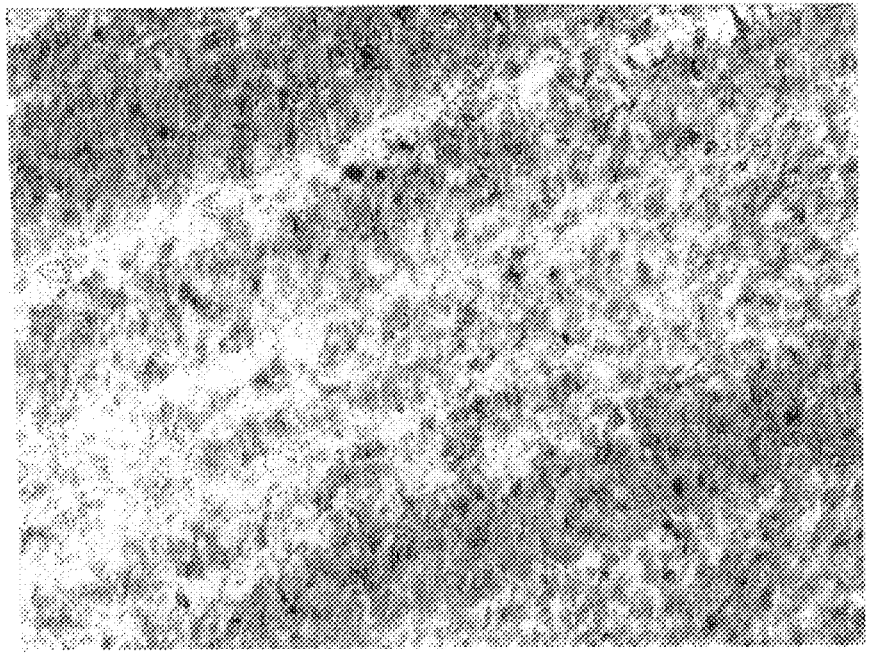
FIG. 3 is an image of the surface of a magnetic recording medium taken by a transmission electron microscope (TEM).
Figure 3B:
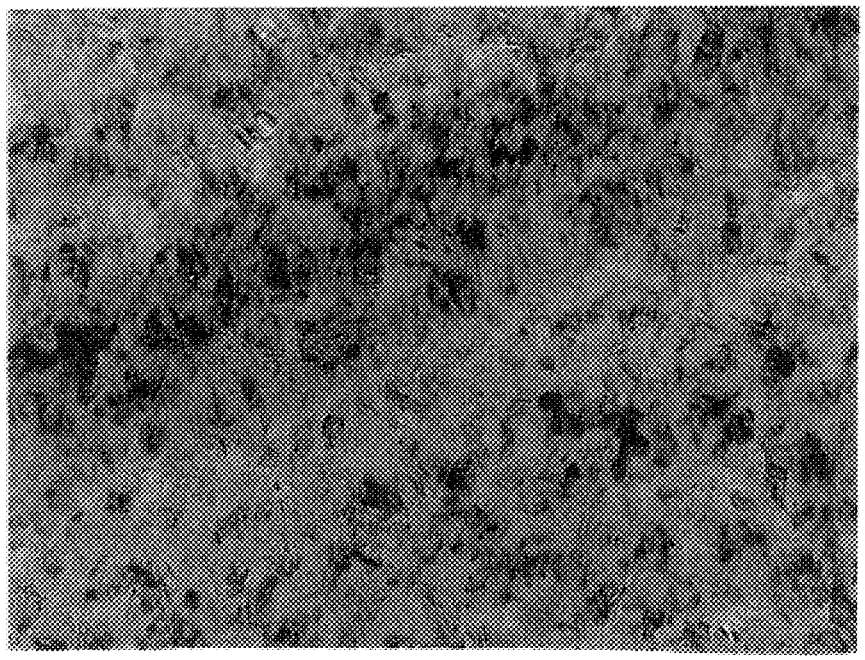

FIGS. 2 and 3 are images of the surfaces of the various media described above taken using a transmission electron microscope (TEM); FIG. 2 shows the case in which the oxygen concentration in the film was 90 wtppm, while FIG. 3 indicates the case in which the oxygen concentration was 140 wtppm. It was determined that in the film shown in FIG. 2, the grains were uniform and a fine film was obtained, while in FIG. 3, the outlines of the crystals were unclear.

Accordingly, it was judged that if the oxygen concentration in the ferromagnetic metallic layer was held at a level of 100 wtppm or less, the coercive force obtained in the case in which the oxygen concentration present in a conventional ferromagnetic metallic layer comprising CoNiCr was 260 wtppm could be increased by 50% or more. That is to say, even if Pt was not contained in the magnetic layer, by reducing the oxygen concentration in the ferromagnetic metallic layer, it was possible to realize a medium applicable to high recording densities.

(Embodiment 2)

In the present Embodiment, the effects of a limitation of the oxygen concentration contained in the metallic base layer in a magnetic recording medium in which a ferromagnetic metallic layer is formed on the surface of a base body with a metallic base layer in between will be discussed. In order to confirm these effects, the impurity concentration contained in the Ar gas during the formation of the metallic base layer was varied within a range of 10 ppb–1 ppm and film formation was conducted. At this time, the impurity concentration contained in the Ar gas during formation of the ferromagnetic metallic layer was fixed at 1 ppm.

Other points were identical to those in Embodiment 1.

Figure 4:
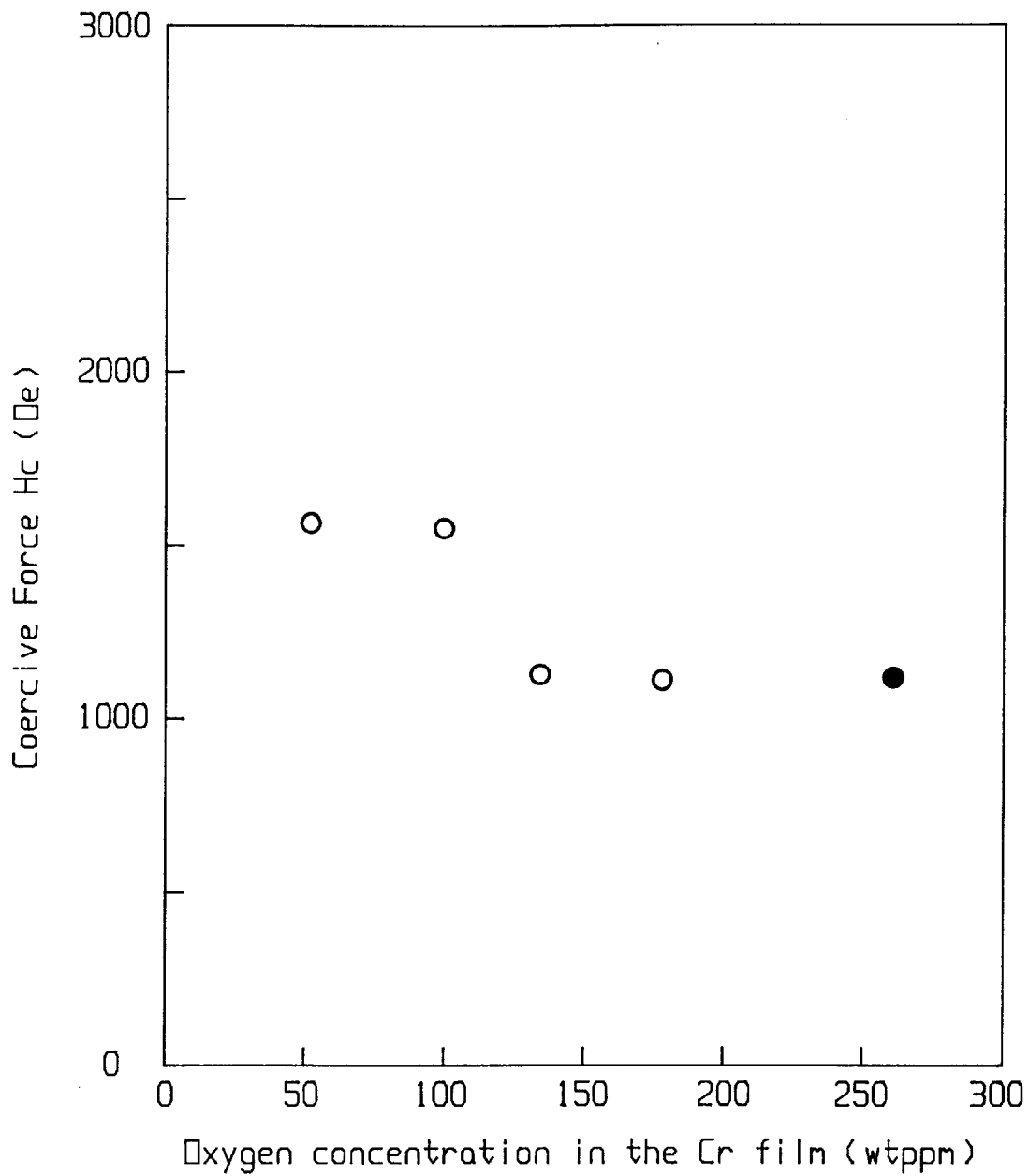
FIG. 4 is a graph showing the relationship between the oxygen concentration in a Cr film in accordance with Embodiment 2 and the coercive force of the medium produced.

In FIG. 4, the magnetic characteristics of the media obtained are indicated by white circles. The horizontal axis in FIG. 4 indicates the oxygen concentration present in the Cr film. The measurement of the oxygen concentration was conducted by means of SIMS. In FIG. 2, the vertical axis indicates the coercive force Hc in the circumferential direction of the sample at this time.

Conventionally, the impurity concentration present in the Ar gas which was employed during formation of the metallic base layer comprising Cr was 1 ppm. Furthermore, the oxygen concentration in the Cr film in a conventional medium was 260 wtppm and the coercive force of the conventional medium is indicated in FIG. 4 by the black circles.

In the present Embodiment, as shown in FIG. 4, by means of keeping the oxygen concentration present in the Cr film at a level of 100 wtppm or less, an effect was obtained of an increase in the coercive force. It was separately observed that the saturation magnetization values at this time were essentially constant.

Accordingly, it was judged that by keeping the oxygen concentration present in the magnetic base layer at a level of 100 wtppm or less, the coercive force obtained in the case in which the oxygen concentration in a conventional metallic base layer comprising Cr was 260 wtppm could be increased by 30% or more. That is to say, even though no Pt was contained in the magnetic layer, by reducing the oxygen concentration in the metallic base layer, it was confirmed that a medium applicable to high recording densities could be realized.

19

(Embodiment 3)

In the present Embodiment, the effects of a limitation of the oxygen concentration contained in the ferromagnetic metallic layer and the oxygen concentration contained in the metallic base layer in a magnetic recording medium in which a ferromagnetic metallic layer is formed on the surface of the base body with a metallic base layer in between, are discussed. In order to confirm these effects, the impurity concentration contained in the Ar gas during the formation of the ferromagnetic metallic layer was varied within a range of 10 ppb–1 ppm, and film formation was conducted. At this time, the impurity concentration contained in the Ar gas during formation of the metallic base layer was fixed at 1.5 ppb.

Other points were identical to those in Embodiment 1.

Figure 5:
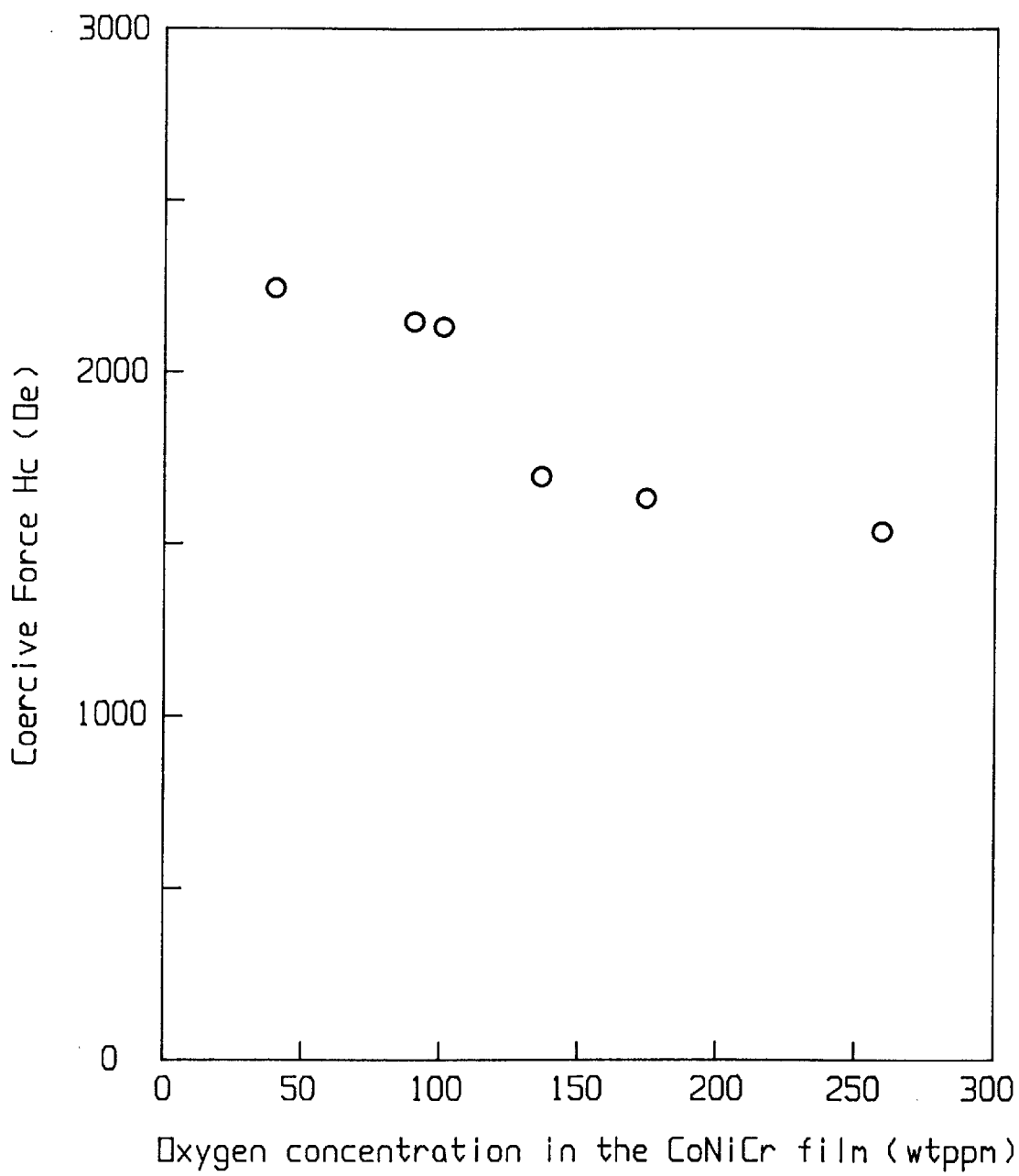
FIG. 5 is a graph showing the relationship between the oxygen concentration present in a CoNiCr film in accordance with Embodiment 3 and the coercive force of the medium produced, with respect to the oxygen concentration present in the Cr film.

In FIG. 5, the magnetic characteristics of the media produced are shown by a white circle. The horizontal axis in FIG. 5 indicates the oxygen concentration in the CoNiCr film. The measurement of the oxygen concentration was conducted by means of SIMS. The vertical axis in FIG. 5 indicates the coercive force Hc in the circumferential direction of the sample at this time.

In the present Embodiment, as shown in FIG. 5, by keeping the oxygen concentration in the CoNiCr film and the oxygen concentration in the Cr film together at a level of 100 wtppm or less, an effect of a further increase in the coercive force was obtained. It was separately observed that the saturation magnetization values at this time were essentially constant.

Accordingly, it was judged that if the oxygen concentration in the ferromagnetic metallic layer and the oxygen concentration in the metallic base layer were together kept at a level of 100 wtppm or less, it was possible to increase the coercive force of the conventional medium by 100% or more (that is to say, to double it). Thus, it was confirmed that even though no Pt was contained in the magnetic layer, by reducing the oxygen concentration in the ferromagnetic metallic layer and the metallic base layer, it was possible to realize a medium which was sufficiently applicable to a high recording density.

(Embodiment 4)

In the present Embodiment, in place of the $Co_{62.5}$—$Ni_{30}$—$Cr_{7.5}$ of Embodiment 3, the following 5 types of alloys were employed as the Cr group alloy target used for forming the ferromagnetic metallic layer: $Co_{85.5}$—$Cr_{10.5}$—$Ta_4$, $Co_{75}$—$Cr_{13}$—$Pt_{12}$, $Co_{70}$—$Ni_{20}$—$Pt_{10}$, $Co_{82.5}$—$Ni_{26}$—$Cr_{7.5}$—$Ta_4$, and $Co_{75.5}$—$Cr_{10.5}$—$Ta_4$—$Pt_{10}$. Here, the number following each element indicates the proportion of that element in (at %).

Other points were identical to those shown in Embodiment 3.

In the present Embodiment, it was confirmed that irrespective of a change in the proportion of the elements comprising the Co group alloy, by maintaining the oxygen concentration present in the Co group alloy film and the oxygen concentration present in the Cr film together at a level of 100 wtppm or less, the coercive force was increased by 50% or more with all Co group alloys.

Accordingly, it was judged that the tendency for the coercive force to increase when the oxygen concentration in the ferromagnetic metallic layer and the oxygen concentration in the metallic base layer were together kept at a level of 100 wtppm or less was possible so long as the target forming the ferromagnetic metallic layer was a Co group alloy. In particular, when the $Co_{62.5}$—$Ni_{30}$—$Cr_{7.5}$ alloy, the

20

$Co_{85.5}$—$Cr_{10.5}$—$Ta_4$ alloy, or the $Co_{82.5}$—$Ni_{26}$—$Cr_{7.5}$—$Ta_4$ alloy was employed, the coercive force was increased by 100% or more in comparison with the conventional medium, so that these alloys are preferably employed.

(Embodiment 5)

In the present Embodiment, the effects of a limitation of the thickness of the metallic base layer in a magnetic recording medium in which a ferromagnetic metallic layer is formed on the surface of a base body with a metallic base layer in between, are discussed. In order to confirm these effects, the thickness of the metallic base layer was varied within a range of 0–100 nm, and film formation was conducted. At this time, a $Co_{85.5}$—$Cr_{10.5}$—$Ta_4$ alloy was employed as the ferromagnetic metallic layer, and the thickness thereof was fixed at 40 nm.

Other points were identical to those in Embodiment 3.

Figure 6:
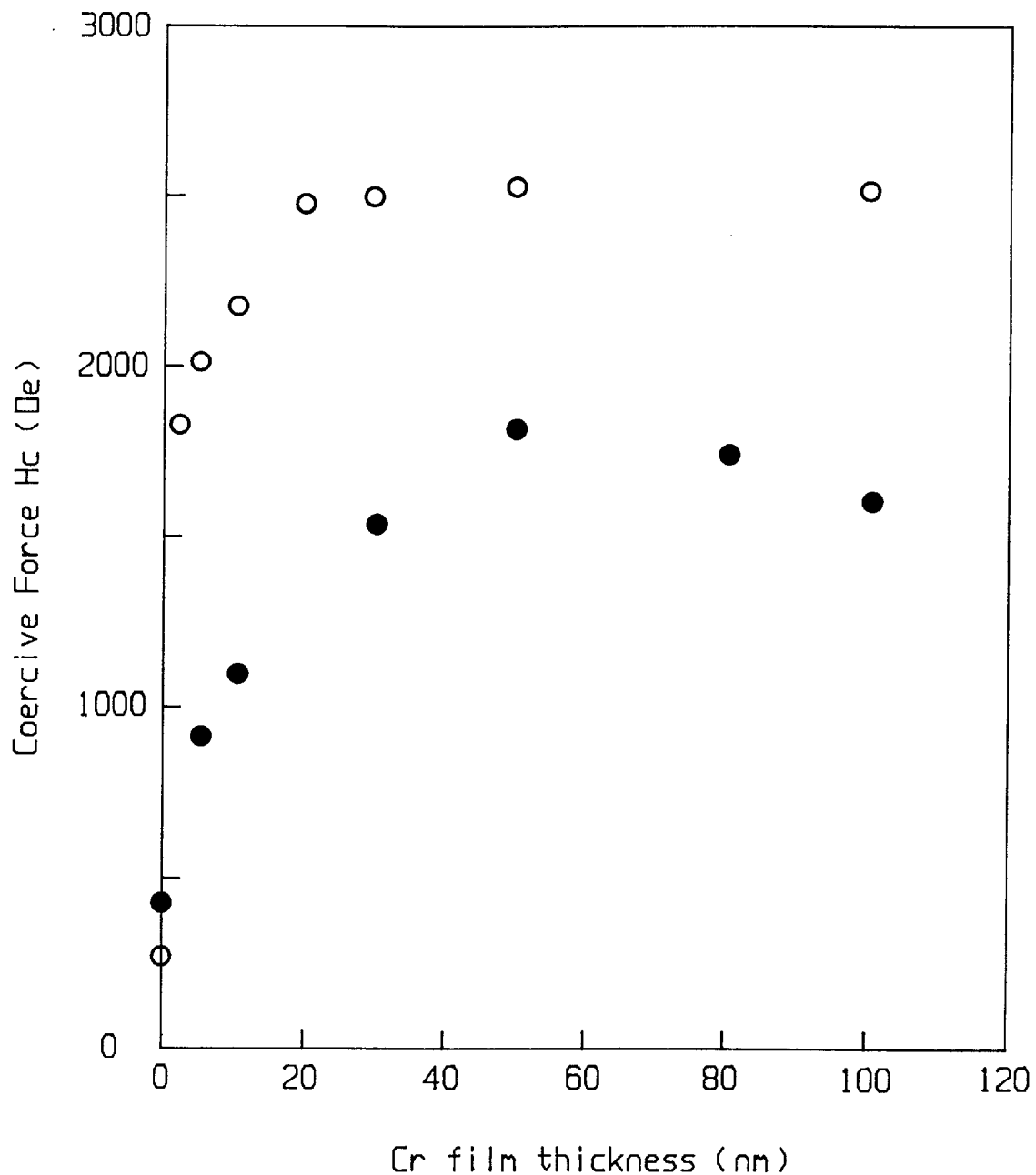
FIG. 6 is a graph showing the relationship between the film thickness of a metallic base layer comprising Cr in accordance with Embodiment 5 and the coercive force of the medium produced.

In FIG. 6, the magnetic characteristics of the media produced are indicated by white circles. The horizontal axis in FIG. 6 indicates the thickness of the metallic base layer comprising Cr. The vertical axis in FIG. 6 indicates the coercive force Hc in the circumferential direction of the sample at this time. Furthermore, as a comparative example, a conventional medium (in which the oxygen concentration in the CoCrTa film and the oxygen concentration in the Cr film were both 260 wtppm) was evaluated in an identical manner. The results thereof are shown by the black circles in FIG. 6.

It was determined from FIG. 6 that when the thickness of the Cr metallic base layer was 2.5 nm or more, the coercive force of the medium of the present Embodiment had a value which was equal to or greater than the maximum value of the conventional medium. Furthermore, when the thickness of the Cr metallic base layer was 5 nm or more, a high coercive force of 2000 Oe could be realized, so that this was further preferable.

Figure 7:
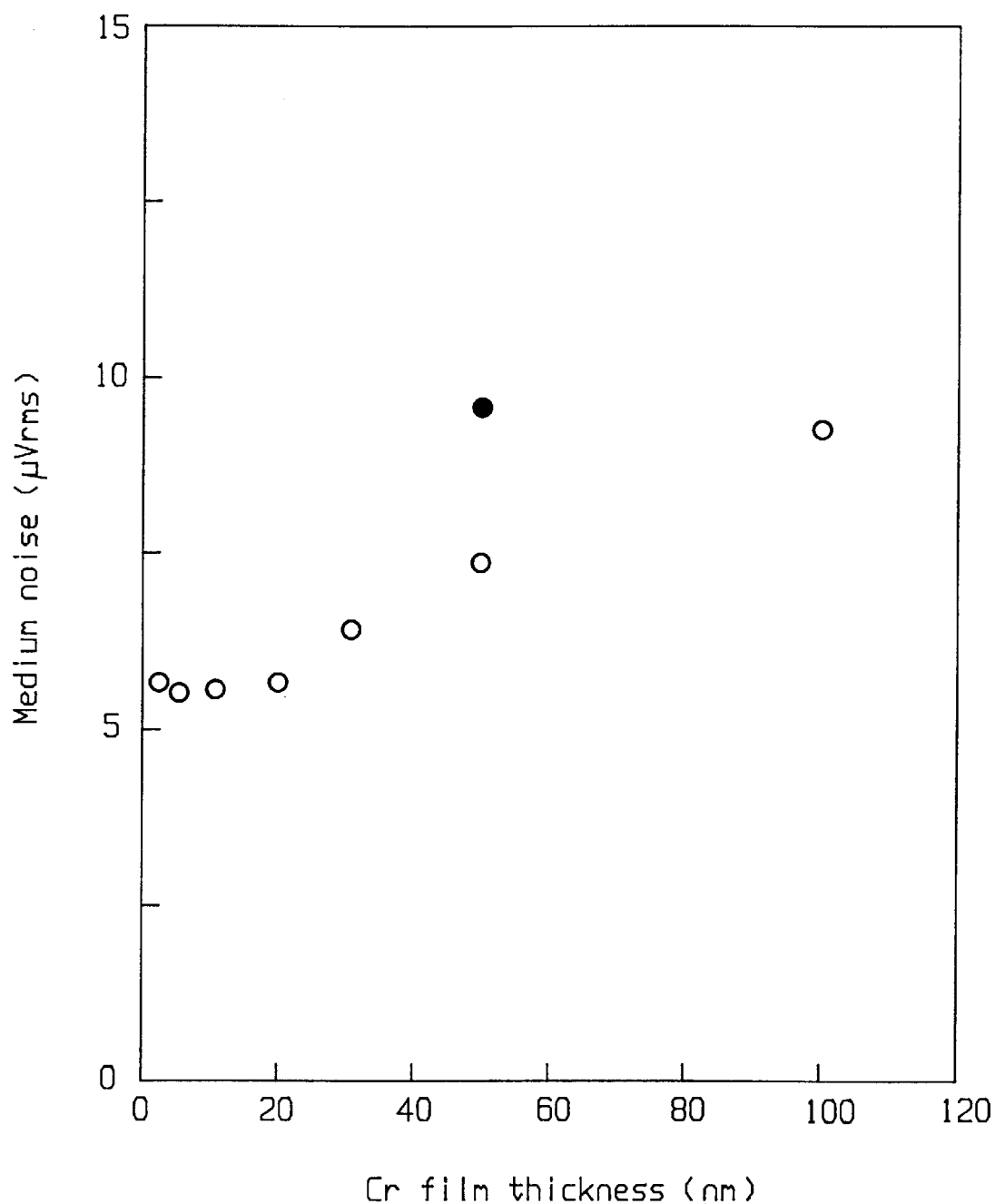
FIG. 7 is a graph showing the relationship between the film thickness of a metallic base layer comprising Cr in accordance with Embodiment 5 and the noise Nm of the medium produced.

FIG. 7 shows the relationship between the thickness of the metallic base layer comprising Cr and the noise N of the medium produced. In the Figure, the white circles indicate the media of the present Embodiment, while the black circles indicate a conventional medium.

Table 2 lists the evaluation methods and conditions for measuring the noise described above. Solely the thickness of the Cr layer was made variable within a range of 1 nm–100 nm, and other conditions were fixed.

TABLE 3

1. Measurement method

Using the RWA501B produced by Guzik Co. and a spectral analyzer as the testing equipment for recording and playback, the level of medium noise was measured under the following measurement conditions.

2. Measurement conditions

| | |
|---|---|
| Medium: | Medium diameter and shape = 89 mm, disc-shaped |
| | Medium base body = NiP/Al |
| | Structure = C (20 nm)/CNiCr (40 nm)/Cr (d)/base body |
| | Thickness d of the Cr layer = 1 nm–100 nm |
| | Product of the residual magnetic flux density and the thickness of the magnetic layer = 240 G$\mu$m |
| | Circumferential speed during disk rotation = 12 m/sec |
| Head: | Type = Thin film head |
| | Pole length = 3.2 $\mu$m (both upper and lower parts) |
| | Gap length = 0.3 $\mu$m |
| | Track width = 6.0 $\mu$m |
| | Number of coil turns = 42 turns |
| | Height above medium = 60 nm (from the surface of the medium) |

TABLE 3-continued

The medium noise N (unit: $\mu$Vrms) was defined by the following formula.

$$N(f_0) = \sqrt{\{(\Delta f)^{-1} \int_0^{fmax} [(Nm(f,f_0))^2 - (Ne(f))^2] df\}}$$

: Nm(f) = medium noise spectrum

Ne(f) = electrical circuit noise spectrum

Bandwidth $\Delta f$ = 30 kHz

Maximum frequency fmax = 20 MHz

Writing frequency $f_0$ = 14 MHz

From FIG. 7 it was determined that when the thickness of the Cr metallic base layer was kept at a level of 100 nm or less, the noise of the medium of the present Embodiment had a value equal to or less the minimum value of the conventional medium. Furthermore, when the thickness of the Cr metallic base layer was 50 nm or less, a 10% or greater reduction in medium noise could be realized, so that this was further preferable.

Accordingly, in the present Embodiment, when the thickness of the metallic base layer comprising Cr was within a range of 2.5 nm–100 nm, media could be obtained which had higher coercive forces or lower levels of medium noise in comparison with conventional media. Furthermore, when the thickness of the metallic base layer comprising Cr was restricted to a range of 5 nm–50 nm, a medium could be realized which was superior with respect to both coercive force and medium noise in comparison with the conventional medium, so that this was further preferable.

(Embodiment 6)

In the present Embodiment, the effects of a restriction of the thickness of the ferromagnetic metallic layer, in a magnetic recording medium in which a ferromagnetic metallic layer is formed on the surface of a base body with a metallic base layer in between, will be discussed. In order to confirm these effects, the thickness of the ferromagnetic metallic layer was varied within a range of 1 nm–40 nm and and film formation was conducted. At this time, the thickness of the metallic base layer was fixed at 50 nm.

Other points were identical to those in Embodiment 3.

Figure 8:
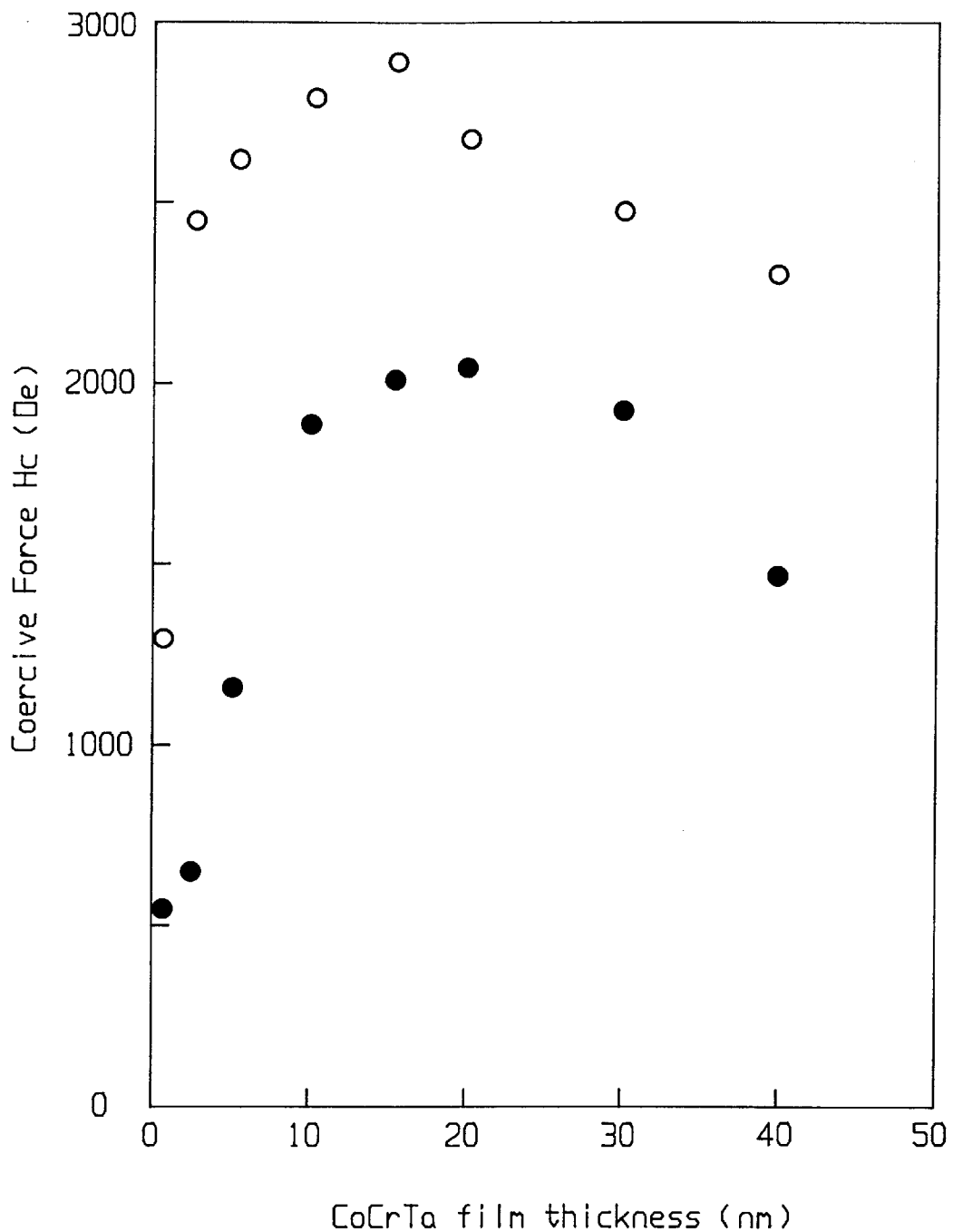
FIG. 8 is a graph showing the relationship between the film thickness of a metallic base layer comprising CoCrTa in accordance with Embodiment 6 and the coercive force of the medium produced.

In FIG. 8, the magnetic characteristics of the media produced are indicated by white circles. The horizontal axis in FIG. 8 shows the thickness of the metallic base layer comprising CoCrTa. The vertical axis in FIG. 8 indicates the coercive force Hc in the circumferential direction of the sample at this time. Furthermore, as a comparative example, a conventional medium (in which the oxygen concentration in the CoCrTa film was 260 wtppm) was similarly evaluated. The results thereof are shown by the black circles in FIG. 8.

It was determined from FIG. 8 that when the thickness of the ferromagnetic metallic layer was within a range of 2.5 nm–40 nm, a medium could be obtained which had a higher coercive force than that of the conventional medium. Furthermore, when the thickness of the ferromagnetic metallic layer was restricted to a range of 5 nm–20 nm, it was possible to realize a coercive force of 2500 Oe or more. Conventionally, when the thickness of the ferromagnetic metallic layer was reduced to 20 nm or less, a large scale reduction in coercive force was observed; however, by means of the present invention, a satisfactory coercive force is obtainable at thicknesses of 20 nm or less, and it is thus possible to increase the freedom of medium design.

(Embodiment 7)

In the present Embodiment, the effects of a restriction in the oxygen concentration contained in the ferromagnetic metallic layer, in a magnetic recording medium in which a ferromagnetic metallic layer is formed on the surface of a base body, will be discussed. In order to confirm these effects, the impurity concentration contained in the Ar gas during the formation of a ferromagnetic metallic layer was varied within a range of 10 ppb–1 ppm, and film formation was conducted.

The sputtering apparatus used in the production of the medium in the present Embodiment was a magnetron sputtering apparatus (model number ILC3013: load-lock style stationary opposition type) produced by Aneruba Co., as in Embodiment 1. Table 3 shows the film formation characteristics during the production of the magnetic recording medium in the present Embodiment.

TABLE 4

| ITEM | SET VALUES |
| --- | --- |
| [1] Base Body material | Al-Mg alloy (provided with a 10 m thick (Ni-P) plated film) |
| [2] Base Body diameter and shape | 89 mm, disc-shaped |
| [3] Base Body surface form | Textured, Ra = 5 nm |
| [4] Attained vacuum degree (Torr) | $5 \times 10^{-7}$ (same in all chambers) |
| [5] Impurity concentration in the Ar gas | 10 ppb - 1 ppm (film formation chamber 1) |
| [6] Ar gas pressure (mTorr) | 2 (film formation chamber 1) |
| [7] Base Body surface temperature maintained (°C.) | 230 (same in all chambers) |
| [8] Target material (at %) | $Co_{85}Cr_{15}$ |
| [9] Target diameter (inch) | 6 |
| [10] Impurity concentration in target (ppm) | 20 |
| [11] Distance between target and base body (mm) | 35 |
| [12] Power applied to target (W) | Direct current, 200 |
| [13] Direct current bias applied to base body during film formation (-Volt) | 300 |
| [14] Film thickness produced (nm) | 100 |

Hereinbelow, the steps involved in the production method for magnetic recording media in accordance with the present Embodiment will be explained in order. The numbers in parentheses below indicate this order.

(1) An aluminum alloy substrate having a disk shape, such that the inner and outer diameters were 25 mm and 89 nm respectively, and the thickness was 1.27 nm, was used as the base body. A (Ni—P) film having a thickness of 10 $\mu$m was provided on the surface of the aluminum alloy substrate by means of a plating method. Slight concentric scratches (texture) were provided in the surface of the (Ni—P) film by means of a mechanical method, and the surface roughness of the base body when scanned in the radial direction of the disk was such that the average center line roughness Ra was 5 nm.

(2) The base body described above was subjected, prior to the film formation described below, to a cleaning process using mechanical and chemical methods, and to a drying process using hot air and the like.

(3) When the drying process described above was complete, the base body was set in a base body holder, the material of which was aluminum, which was placed in the load chamber of the sputtering apparatus. After the interior of the load chamber was evacuated to an attained vacuum degree of $3 \times 10^{-9}$ Torr using a vacuum exhaust apparatus, a heating process was conducted with respect to the base body at a temperature of 230° C. and for a period of 5 minutes and using an infrared lamp.

(4) The base body holder was then moved from the load chamber to film formation chamber 1 for CoCr film production. After being moved, the base body was maintained at a temperature of 230° C. using an infrared lamp. Film formation chamber 1 was evacuated in advance to an attained vacuum degree of $3 \times 10^{-9}$ Torr, and after the base body holder was moved, the door valve between the load chamber and the film formation chamber 1 was closed. The impurity concentration of the CoCr target which was used was 20 ppm.

(5) Ar gas was introduced into film formation chamber 1, and the gas pressure within film formation chamber 1 was set to 2 mTorr. The impurity concentration contained in the Ar gas which was employed was varied within a range of 10 ppb–1 ppm.

(6) A voltage of 200 W was applied to the CoCr target from a direct current power source, and a plasma was generated. As a result, the CoCr target was caused to sputter, and a CoCr layer having a thickness of 100 nm was formed on the surface of the base body, which was placed in a position of parallel opposition to the target.

(7) After the formation of the CoCr layer, the base body holder was moved from film formation chamber 1 to the extraction chamber. After this, $N_2$ gas was introduced into the extraction chamber, and once the pressure within was returned to atmospheric pressure, the base body was removed. By means of processes (1)–(6) described above, a magnetic recording medium having a CoCr/NiP/Al structure was produced.

A target was used in which the presence of impurities was strictly suppressed. The composition of the target used was as follows: 85 at % Co and 15 at % Cr, and the impurity concentration of the target was 20 ppm. The impurities were as follows: Fe:27, Si<10, Al<10, C:30, O:20, N>10 (wtppm).

Figure 9:
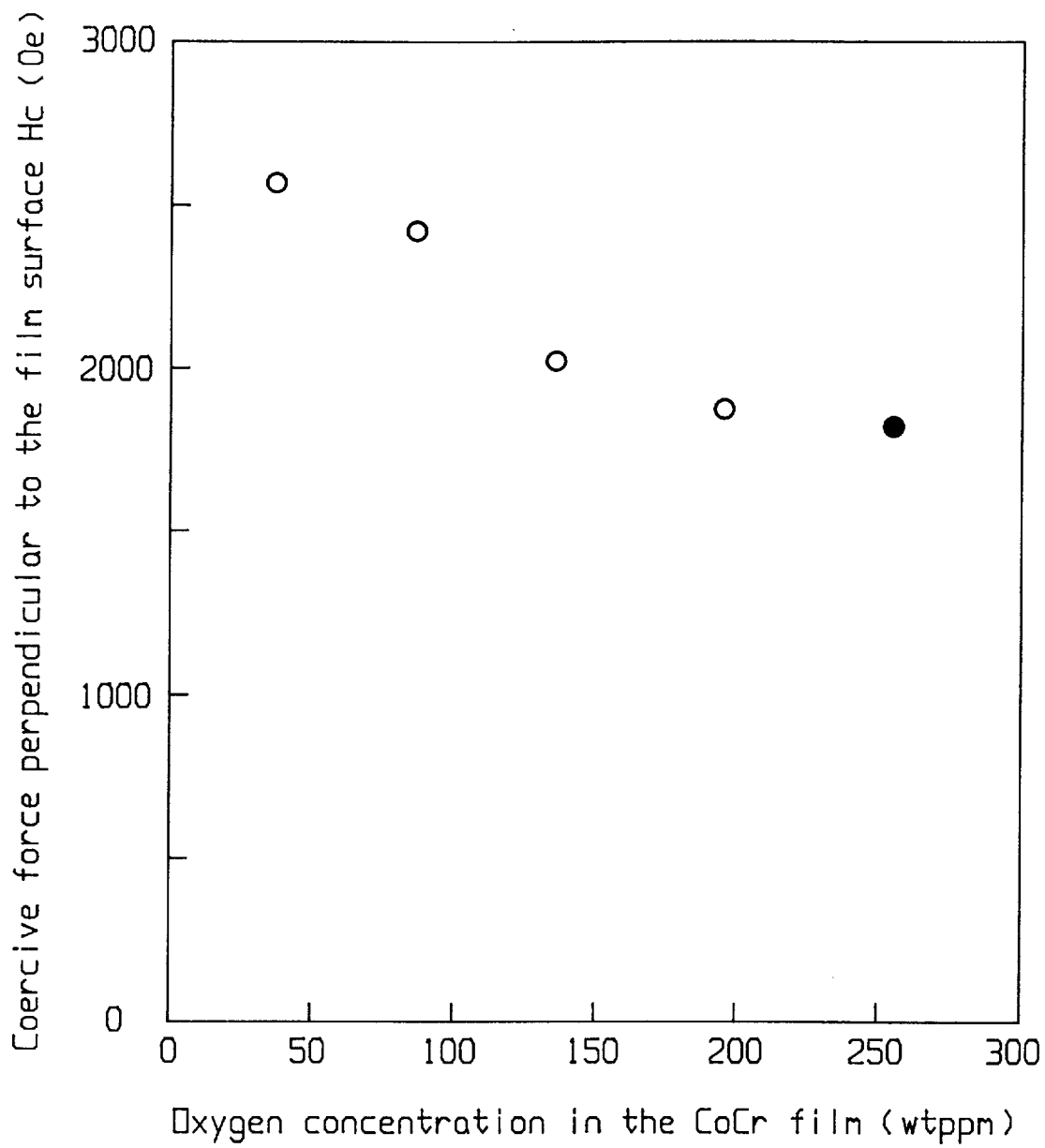
FIG. 9 is a graph showing the relationship between the oxygen concentration present in a CoNiCr film in accordance with Embodiment 7 and the coercive force of the medium produced.

In FIG. 9, the magnetic characteristics of the media produced are indicated by a white circle. The horizontal axis in FIG. 9 indicates the oxygen concentration within the CoNiCr film. The measurement of the oxygen concentration was conducted by means of SIMS. The vertical axis in FIG. 9 indicates the coercive force Hc in the circumferential direction of the sample at this time.

Conventionally, the impurity concentration present in the Ar gas used during the formation of a ferromagnetic metallic layer comprising CoCr was 1 ppm. Furthermore, the oxygen concentration in the CoCr film of a conventional medium was 260 wtppm, and the coercive force of a conventional medium is indicated in FIG. 9 by a black circle.

In the present Embodiment, as shown in FIG. 9, by keeping the oxygen concentration in the CoCr film at a level of 100 wtppm or less, an effect of a great increase in the coercive force in a direction perpendicular to the film surface was obtained. It was separately observed that the saturation magnetization values at this time were essentially constant.

Accordingly, if the oxygen concentration of the ferromagnetic metallic layer is kept at a level of 100 wtppm or less, it is possible to realize an increase of 20% or more in the coercive force obtained when the oxygen concentration in a conventional ferromagnetic metallic layer comprising CoCr was 260 wtppm. That is to say, by reducing the oxygen concentration in the ferromagnetic metallic layer, it was confirmed that it was possible to realize a medium which was applicable to high recording densities.

Furthermore, in the present Embodiment, the case was described in which, in a magnetic recording medium in which a ferromagnetic metallic layer was formed on the surface of a base body, the ferromagnetic metallic layer comprised CoCr; however, the same trends were confirmed when the ferromagnetic metallic layer comprised CoCrTa and CoPt.

Furthermore, even in the case in which the ferromagnetic metallic layer was provided on the surface of the base body with a soft magnetic film, for example, NiFe, CoZrNb, or the like, in between, identical effects were obtained.

In the Embodiments above, a Ni—P/Al substrate was employed as the base body; however, it was confirmed that the present invention is effective even when a non-magnetic layer was provided on the surface of the base body, for example, when a glass substrate having Ti, C, or the like formed thereon was employed.

(Embodiment 8)

In the present Embodiment, the effects of a reduction in the normalized coercive force (expressed by $Hc/Hk^{grain}$), in a magnetic recording medium in which a ferromagnetic metallic layer is formed on the surface of the base body with a metallic base layer in between, are discussed. In order to confirm these effects, the impurity concentration contained in the Ar gas during the formation of both the ferromagnetic metallic layer and the metallic base layer was varied within a range of 10 ppb to 1 ppm, and film formation was conducted. At this time, the material used for the metallic base layer was Cr, and the thickness thereof was fixed at 50 nm. Furthermore, six types of Co group alloy were used for the ferromagnetic metallic layer, and the thickness thereof was fixed at 40 nm. The six types of Co group alloy were: $Co_{62.5}$—$Ni_{30}$—$Cr_{7.5}$, $Co_{85.5}$—$Cr_{10.5}$—$Ta_4$, $Co_{75}$—$Cr_{13}$—$Pt_{12}$, $Co_{70}$—$Ni_{20}$—$Pt_{10}$, $Co_{82.5}$—$Ni_{26}$—$Cr_{7.5}$—$Ta_4$, and $Co_{75.5}$—$Cr_{10.5}$—$Ta_4$—$Pt_{10}$. Here, the numbers following each element indicate the proportion of that element in (at %).

Other points were identical to those of Embodiment 3.

Figure 10:
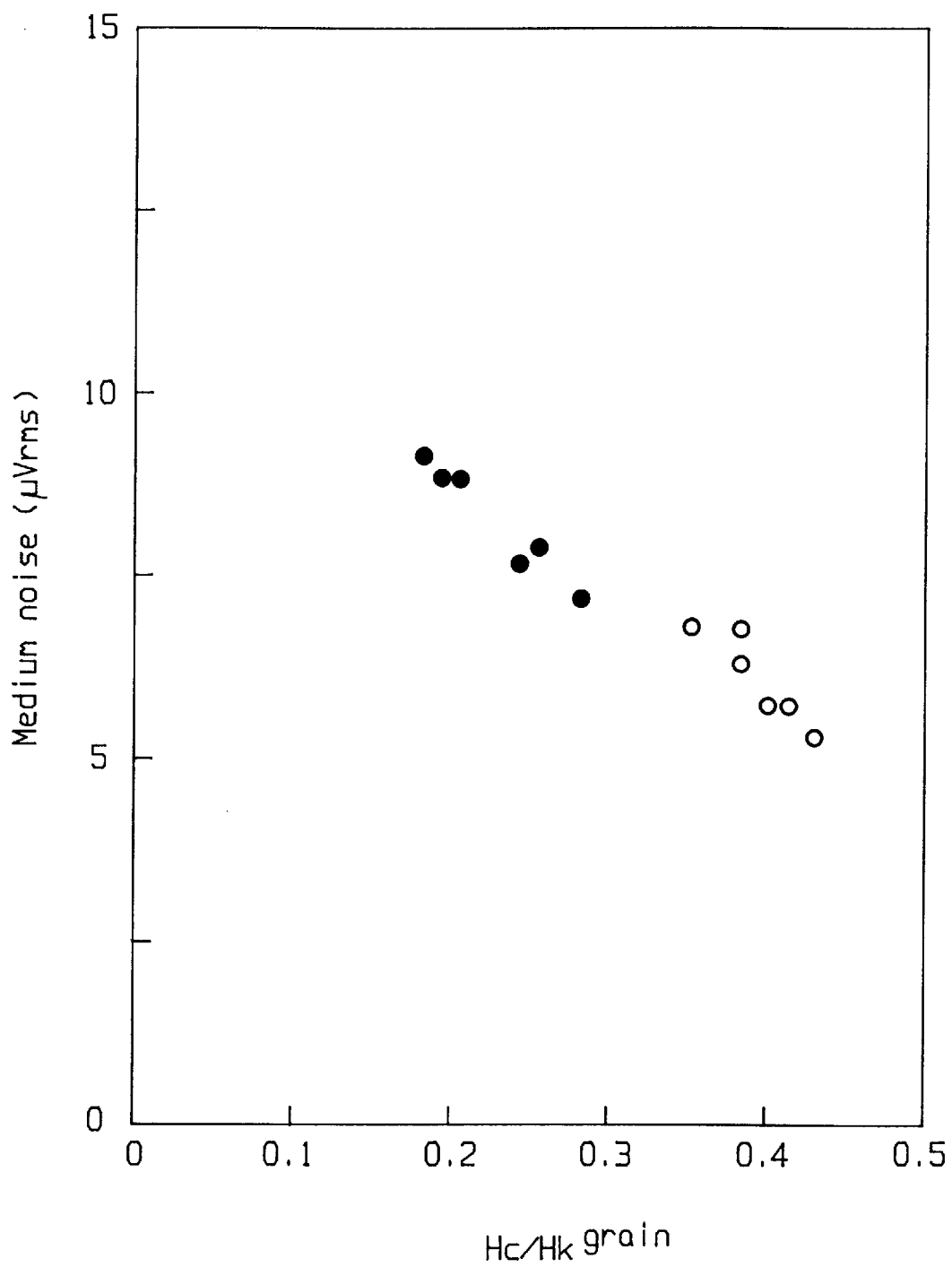
FIG. 10 is a graph showing the relationship between the normalized coercive force ($Hc/Hk^{grain}$) in accordance with Embodiment 8 and the noise (Nm) of the medium produced.

In FIG. 10, the magnetic characteristics of the media produced are indicated by a white circle. The horizontal axis in FIG. 10 indicates the normalized coercive force (Hc/$Hk^{grain}$), and the vertical axis in FIG. 10 indicates the level of noise N in the media produced. The measurement method and conditions for the level of medium noise were identical to those in Embodiment 5. Furthermore as a comparative example, an identical evaluation was conducted with respect to a conventional medium (in which the oxygen concentration in the ferromagnetic metallic layer was 260 wtppm). The results thereof are shown by the black circles in FIG. 10.

The values of the normalized coercive force for each Co alloy shown in FIG. 10 are listed in Table 4.

TABLE 5

| Composition (at %) | Normalized coercive force in the present Embodiment | Normalized coercive force in the Comparative Example |
| --- | --- | --- |
| $Co_{62.5}$—$Ni_{30}$—$Cr_{7.5}$ | 0.40 | 0.18 |
| $Co_{85.5}$—$Cr_{10.5}$—$Ta_4$ | 0.42 | 0.28 |
| $Co_{75}$—$Cr_{13}$—$Pt_{12}$ | 0.38 | 0.19 |
| $Co_{70}$—$Ni_{20}$—$Pt_{10}$ | 0.35 | 0.20 |
| $Co_{82.5}$—$Ni_{26}$—$Cr_{7.5}$—$Ta_4$ | 0.41 | 0.24 |
| $Co_{75.5}$—$Cr_{10.5}$—$Ta_4$—$Pt_{10}$ | 0.38 | 0.25 |

It was determined from FIG. 10 that irrespective of the material used for the ferromagnetic metallic layer, the media of the present Embodiment possessed a high normalized coercive force of 0.3 or more, in comparison to the normalized coercive force of the conventional media, which were less than 0.3. Furthermore, with respect to the level of medium noise, this level was lower in all the media in accordance with the present Embodiment than in the conventional media. Incidentally, the upper limit of the normalized coercive force is theoretically indicated to be 0.5 when the crystal grains are completely isolated; however, in systems such as thin films having some random portions, this value is smaller than 0.5.

Accordingly, by means of restricting the normalized coercive force (Hc/Hk$^{grain}$) of the ferromagnetic metallic layer to a range from 0.3 to less than 0.5, it was confirmed that it is possible to realize a medium having a low level of noise which is applicable to high recording densities.

In the Embodiment given above, a Ni—P/Al substrate was employed as the base body; however, it is also possible to use Al, glass, Si, Ti, C, ceramics, plastics, resins, and any one of these having metallic films or insulating films formed thereon.

(Embodiment 9)

In the present Embodiment, the effects of a restriction, to a level of 10 ppb or less and a level of 100 ppt or less, of the impurity concentration in the Ar gas used in film formation, in a manufacturing method for magnetic recording media in which a metallic base layer and ferromagnetic metallic layer are successively formed on the surface of a base body by means of a sputtering method, will be explained. In order to confirm these effects, the impurity concentrations contained in the Ar gas during formation of the ferromagnetic metallic layer and the metallic base layer were varied within a range of 10 ppt–10 ppm, and film formation was conducted.

Other points were identical to those in Embodiment 3.

Figure 11:
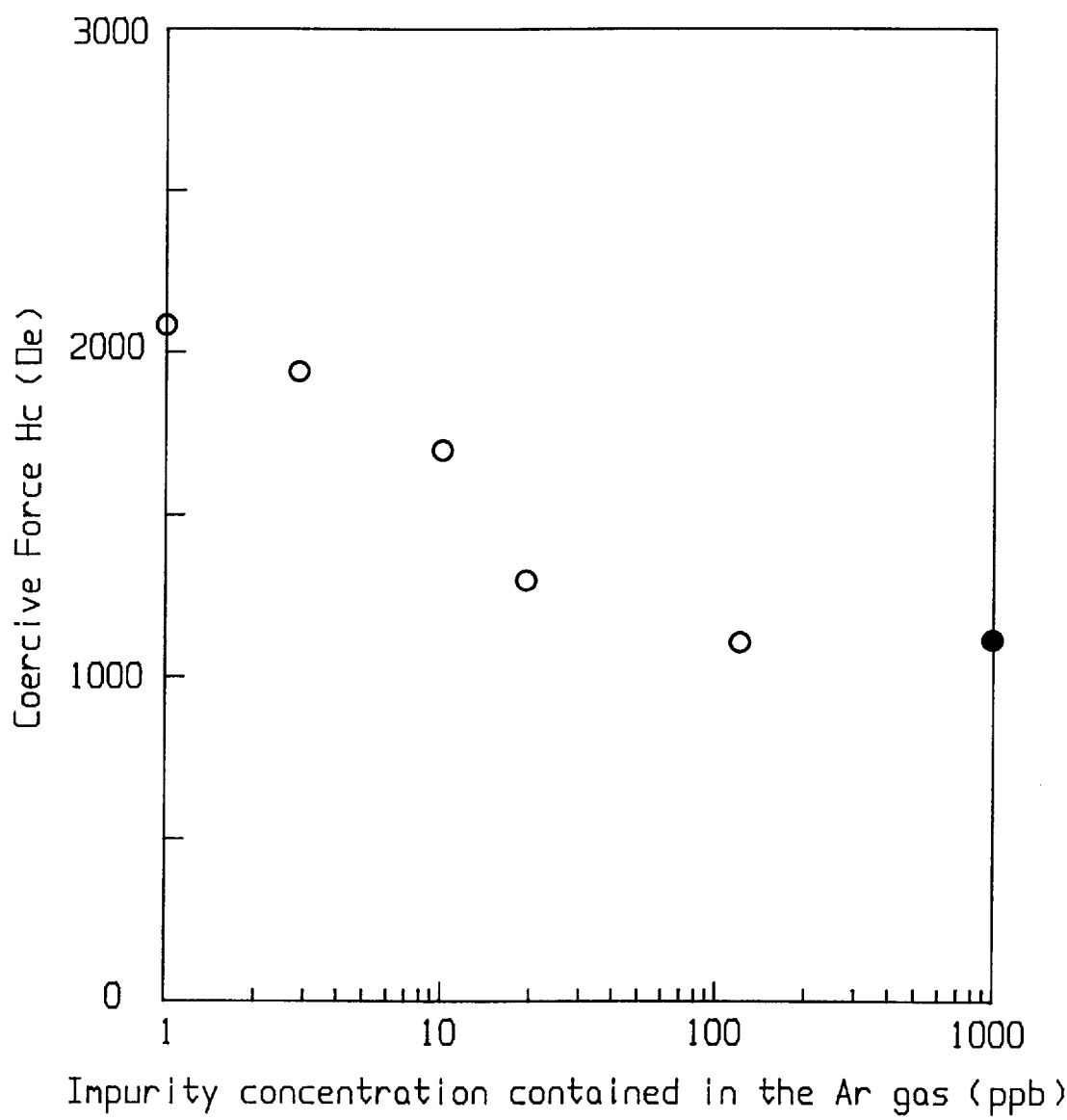
FIG. 11 is a graph showing the relationship between the impurity concentration present in the Ar gas used during the formation of a ferromagnetic metallic layer and a metallic base layer in accordance with Embodiment 9, and the coercive force of the medium produced.

In FIG. 11, the magnetic characteristics of the media produced are indicated by white circles. The horizontal axis in FIG. 11 indicates the impurity concentration contained in the Ar gas during the formation of the ferromagnetic metallic layer and the metallic base layer, while the vertical axis in FIG. 11 indicates the coercive force Hc in the circumferential direction of the sample at this time. Furthermore, the results obtained with respect to a conventional medium are indicated with black circles, as a conventional example. The impurity concentration contained in the Ar gas used in the production of a conventional medium is 1 ppm or more.

It was determined from FIG. 11 that when the impurity concentration contained in the Ar gas was kept at 10 ppb or less, it was possible to obtain a medium having a coercive force which was 30% or more higher than that conventionally obtainable. Furthermore, when the impurity concentration contained in the Ar gas was kept at a level of 100 ppt or less, it was possible to realize a coercive force which was 50% or more higher than that conventionally obtainable, so that this is further preferable.

Furthermore, it was separately confirmed that the above effects were obtainable even when a Co group alloy layer was directly formed on the surface of the base body without an intervening metallic base layer.

(Embodiment 10)

In the present Embodiment, the effects of conducting cleaning processing with respect to the surface of the base body prior to forming the metallic base layer will be discussed. The cleaning method employed to confirm these effects, and the order thereof, are as given below.

(1) The base body comprising an aluminum alloy substrate which was employed in Embodiment 3 was first placed within a cleaning chamber, and this chamber was then evacuated to a vacuum degree of 6×10$^{-7}$ Torr.

(2) The base body was heated for a period of 5 minutes using an infrared lamp so that the surface temperature thereof reached 230° C.

(3) Ar gas having an impurity concentration of 10 ppb was introduced into the cleaning chamber, and the gas pressure was set at 1 mTorr.

(4) A voltage was applied to the base body from an RF power source, and a cleaning process was conducted. The conditions of this were such that the power density was 2.5 W/cm$^2$, and the cleaning rate was 0.013 nm/sec; by altering the cleaning period, the amount which was stripped was varied within a range of 0.2–4 nm.

(5) After this, a Cr film was formed as a metallic base layer on the surface of the base body, a CoNiCr film was formed as a ferromagnetic metallic layer, and a C film was formed as a protective layer. The film formation conditions thereof were identical to those given in Embodiment 3.

Figure 12:
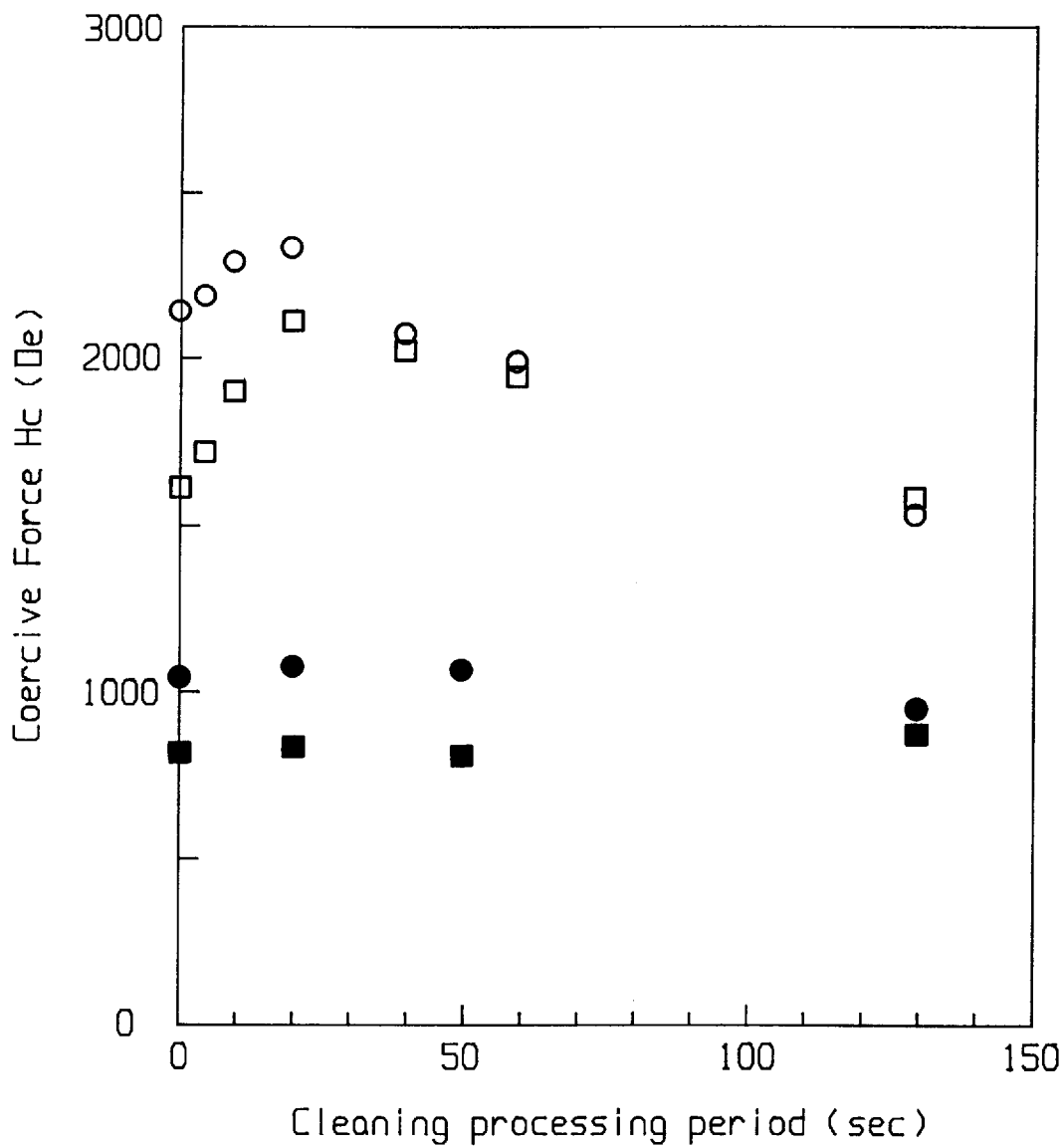
FIG. 12 is a graph showing the relationship between the amount of stripping of the base body surface carried out by the cleaning processing in accordance with Embodiment 10, and the coercive force of the medium produced.

In FIG. 12, the relationship between the amount stripped from the base body surface by means of the cleaning described above and the coercive force of the media produced is shown. The horizontal axis shows the cleaning time with respect to the surface of the (Ni—P) layer; 130 seconds corresponds to an amount stripped of 2.4 nm. The vertical axis indicates the coercive force of the medium at this time; Hc (cir) indicates the coercive force of the disc shaped base body in the circumferential direction, while Hc (rad) shows the coercive force in the radial direction, and these are represented by, respectively, white circles and white squares. Furthermore, as a comparative example, the coercive forces of media which were subjected to cleaning using Ar gas having an impurity concentration of 20 ppb are indicated by black circles and black squares.

As shown in FIG. 12, when the amount stripped from the base body surface by means of the cleaning process was within a range of 0.2 nm–1.0 nm, the coercive force increased in the circumferential direction and the radial direction, and furthermore, it was also possible to alter the ratio Hc(cir)/Hc(rad) of the coercive forces. It was determined that a range of 0.3 nm–0.6 nm was particularly advantageous for this increase in the coercive force.

Figure 13:
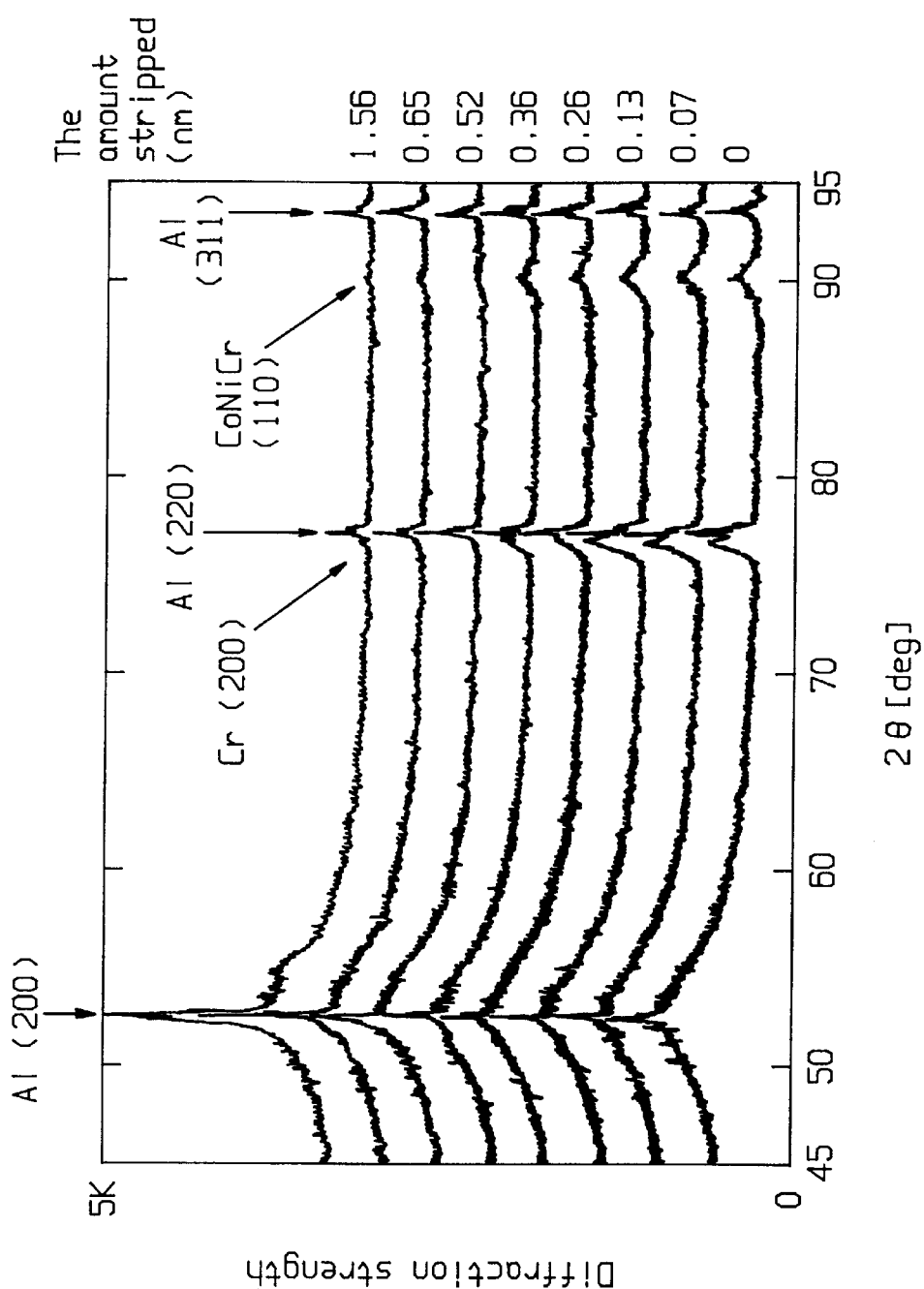
FIG. 13 is a graph showing the results of the X-ray diffraction of the surface of a medium in accordance with Embodiment 10.

FIG. 13 shows the results of an X-ray diffraction of each medium surface at this time; it indicates that the crystalline structure of the Cr base layer and the crystalline structure of the Co alloy layer thereon are altered by the cleaning process, and if the amount stripped is too great, the diffraction peaks of Cr (200) and CoNiCr (110) disappear.

Accordingly, it was determined that conducting a cleaning process which strips the appropriate amount from the surface of the base body prior to formation of a metallic base layer is effective in the realization of a high coercive force. This effect was also confirmed with other Co group alloys, for example $Co_{85.5}$—$Cr_{10.5}$—$Ta_4$, $Co_{75}$—$Cr_{13}$—$Pt_{12}$, $Co_{70}$—$Ni_{20}$—$Pt_{10}$, $Co_{82.5}$—$Ni_{26}$—$Cr_{7.5}$—$Ta_4$, and $Co_{75.5}$—$Cr_{10.5}$—$Ta_4$—$Pt_{10}$. Here, the numbers following each element indicate the proportion of that element in (at %). Furthermore, it was separately confirmed that the effects described above were also obtainable when a Co group alloy layer was provided directly on the surface of the base body without a metallic base layer in between.

(Embodiment 11)

In the present Embodiment, the effects of a restriction of the impurity concentration of the target used in the formation of the metallic base layer to a level of 150 ppm or less will be discussed. In order to confirm the effects, the impurity concentration contained in the target used in the formation of a metallic base layer comprising Cr was varied within a range of 50 ppm–300 ppm, and film formation was conducted. At this time, the impurity concentration in the CoNiCr target which was used to form the ferromagnetic metallic layer was 20 ppm. Furthermore, the impurity concentration in the Ar gas used during the formation of the metallic base layer and the ferromagnetic metallic layer was 1.5 ppb.

Other points were identical to those in Embodiment 19.

Figure 14:
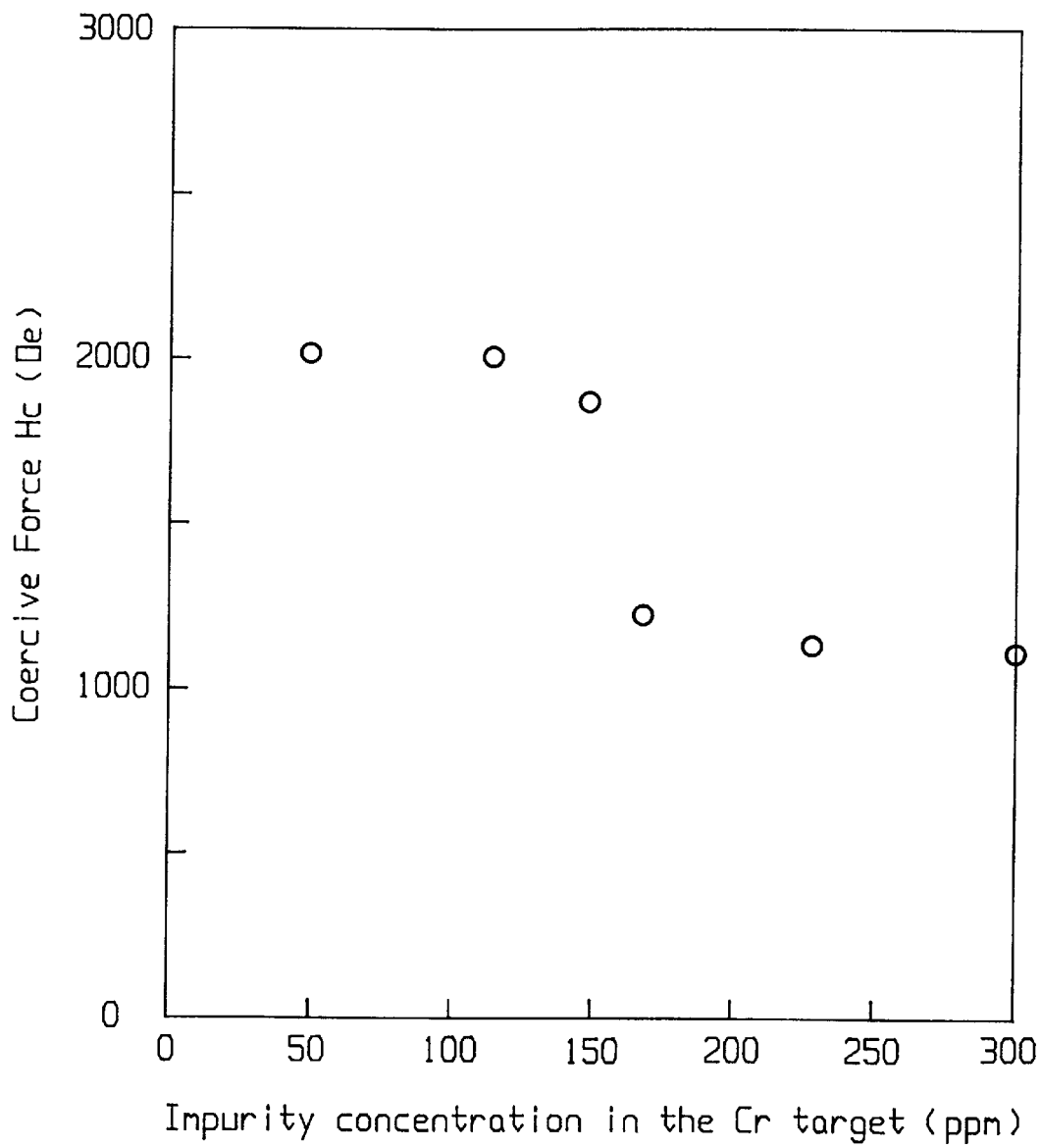
FIG. 14 is a graph showing the relationship between the impurity concentration of the target used during the formation of a metallic base layer in accordance with Embodiment 11 and the coercive force of the medium produced.

In FIG. 14, the relationship between the impurity concentration in the target used during the formation of the metallic base layer and the coercive force of the media produced is shown. The vertical axis shows the values of the coercive force in the circumferential direction of the disc shaped base bodies.

As shown in FIG. 14, it was determined that when the impurity concentration in the target used during the formation of the metallic base layer was kept at 150 ppm or less, the coercive force of the media dramatically increased.

(Embodiment 12)

In the present Embodiment, the effects of a restriction of the impurity concentration in the target used during the formation of the ferromagnetic metallic layer to a level of 30 ppm or less will be discussed. In order to confirm the effect, $Co_{85.5}$—$Cr_{10.5}$—$Ta_4$ was used as the target during the formation of the ferromagnetic metallic layer, and the impurity concentration contained in this target was varied within a range of 5 ppm–200 ppm, and film formation was conducted. At this time, the impurity concentration in the Cr target used to form the metallic base layer was 120 ppm. Furthermore, the impurity concentration in the Ar gas which was used during the formation of the metallic base layer and the ferromagnetic metallic layer was 1.5 ppb.

Other points were identical to those in Embodiment 19.

Figure 15:
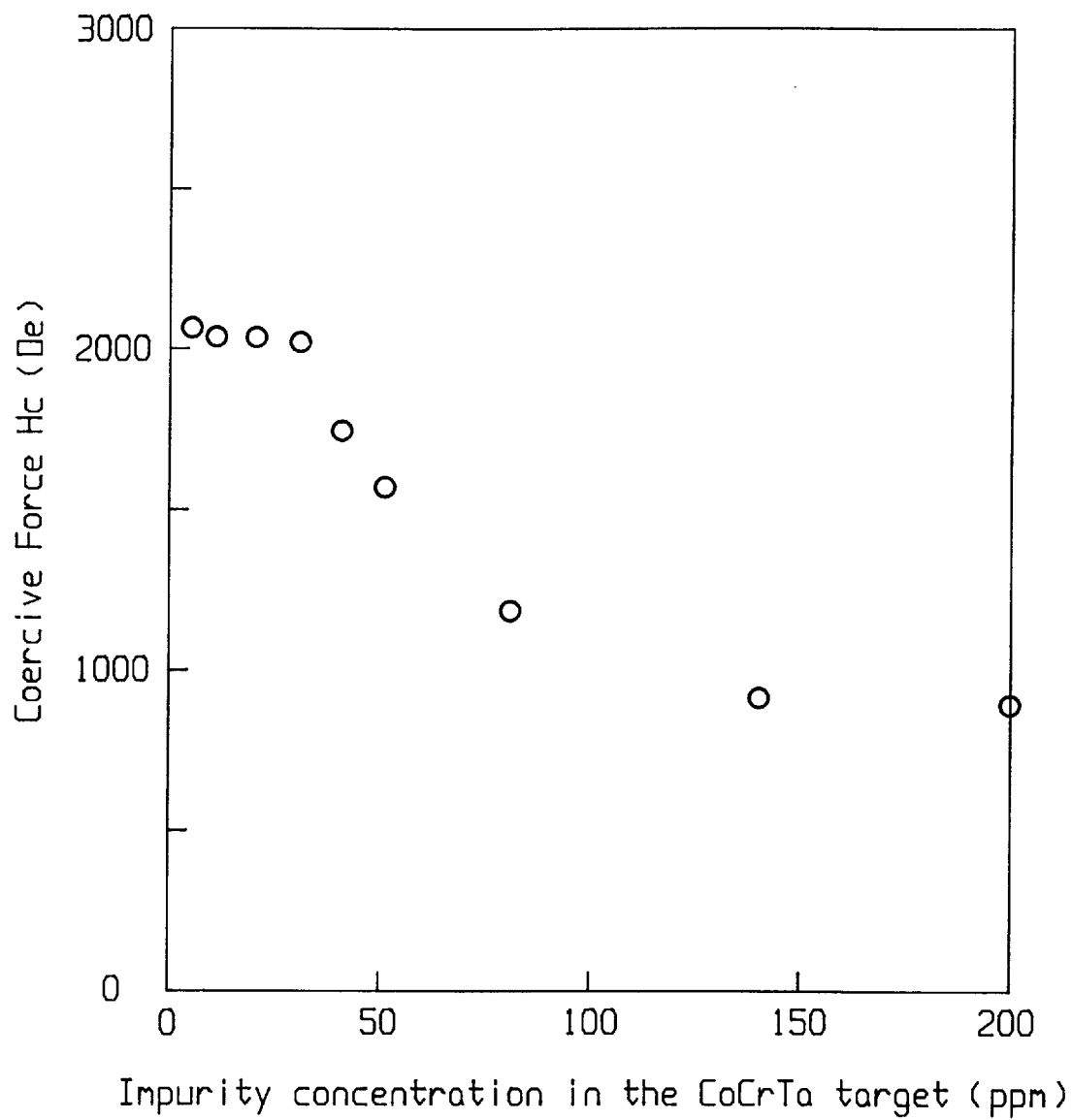
FIG. 15 is a graph showing the relationship between the impurity concentration of a target used during the formation of a ferromagnetic metallic layer in accordance with Embodiment 12, and the coercive force of the medium produced.

In FIG. 15, the relationship between the impurity concentration of the target used during the formation of the ferromagnetic metallic layer and the coercive force of the media produced is shown. The vertical axis indicates the values of the coercive force of the disc shaped base bodies in the circumferential direction.

As shown in FIG. 15, it was determined that when the impurity concentration of the target used during the formation of the ferromagnetic metallic layer was kept at 30 ppm or less, the coercive force of the media dramatically increased.

(Embodiment 13)

In the present Embodiment, the effects of applying a negative bias to the base body during the formation of the metallic base layer and/or the ferromagnetic metallic layer will be discussed. In order to confirm these effects, the value of the applied bias mentioned above was varied within a range of 0--500V, and film formation was conducted. Furthermore, 3 combinations of layers were executed while applying a bias (only a metallic base layer, only a ferromagnetic metallic layer, and both a metallic base layer and a ferromagnetic metallic layer). At this time, the impurity concentration in the Cr target used to form the metallic base layer was 120 ppm and the impurity concentration in the CoNiCr target used to form the ferromagnetic metallic layer was 20 ppm. Furthermore, the impurity concentration in the Ar gas used during the formation of the metallic base layer and the ferromagnetic metallic layer was 1.5 ppb.

Other points were identical to those in Embodiment 19.

Figure 16:
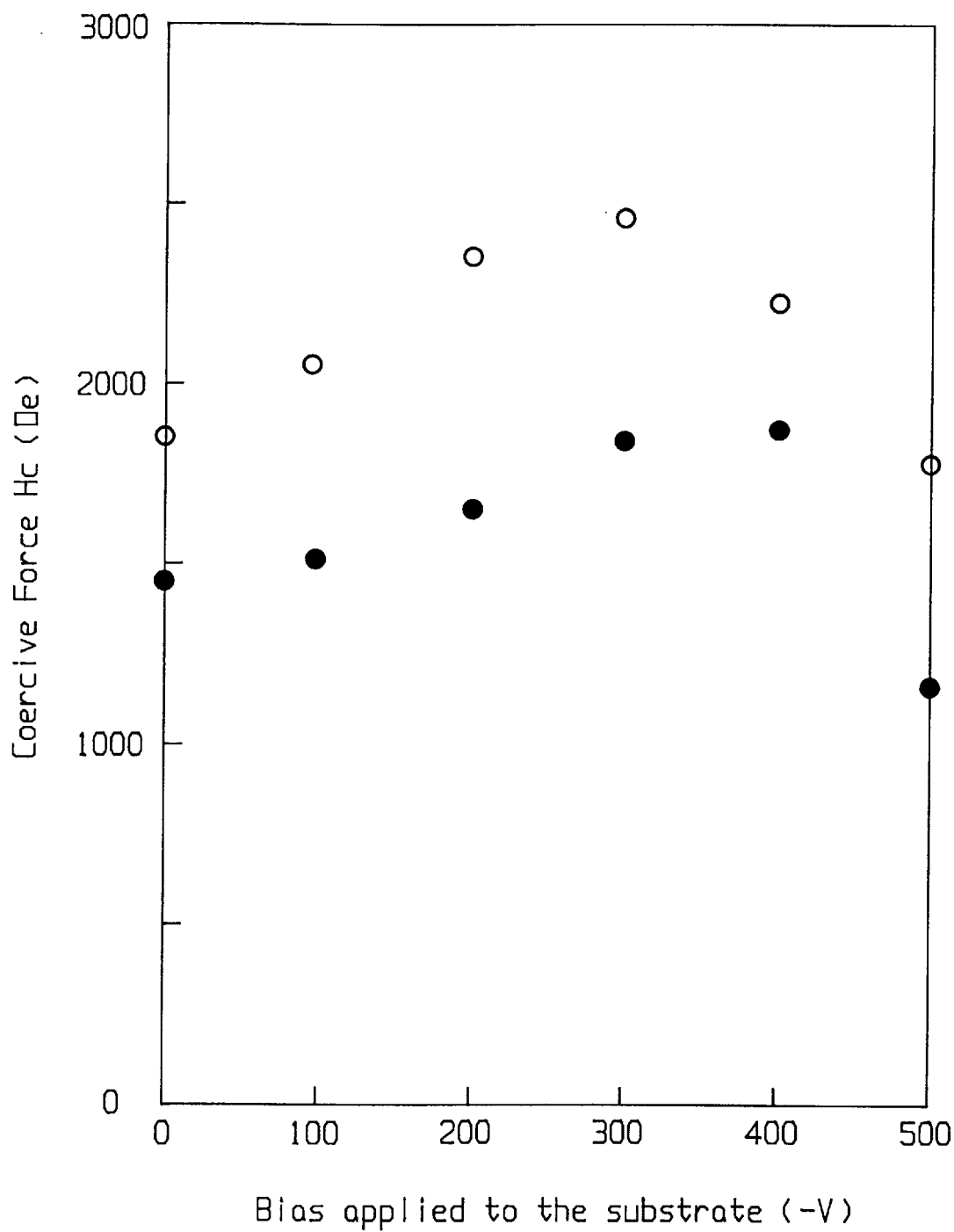
FIG. 16 is a graph showing the relationship between the negative bias value applied to the base body in accordance with Embodiment 13 and the coercive force of the medium produced.

In FIG. 16, the relationship between the negative bias applied to the base body and the coercive force of the media produced is shown. The vertical axis indicates the values of the coercive force of the disc shaped base bodies in the circumferential direction using white circles. Furthermore, an identical evaluation was conducted with respect to a conventional medium (in which both the oxygen concentration in the CoNiCr film and the oxygen concentration in the Cr film were 260 wtppm) as a comparative example. These results are shown in FIG. 16 by black circles.

As shown in FIG. 16, the coercive force of the medium increased even when a bias was applied only during the formation of one or the other layers; however, when a bias was applied during the formation of both layers, the coercive force was further increased, so that this more preferable. Furthermore, it was determined that if the applied bias value is restricted to a range of –100V--400V, an increase of 10% or more in the coercive force can be realized in comparison to the case in which a bias is not applied.

(Embodiment 14)

In the present Embodiment, the effects of setting the vacuum degree attained in the film formation chambers in which the metallic base layer and/or the ferromagnetic metallic layer is formed to a level of $8 \times 10^{-8}$ Torr or less will be discussed. In order to confirm these effects, the value of the attained vacuum degree in the film formation chambers used for the formation of the metallic base layer and the ferromagnetic metallic layer was varied within a range of $3 \times 10^{-9}$ Torr–$5 \times 10^{-7}$ Torr, and film formation was conducted. At this time, the impurity concentration in the Cr target used for the formation of the metallic base layer was 120 ppm, and the impurity concentration in the CoNiCr target used in the formation of the ferromagnetic metallic layer was 20 ppm. Furthermore, the impurity concentration in the Ar gas used during the formation of the metallic base layer and the ferromagnetic metallic layer was 1.5 ppb.

Other points were identical to those in Embodiment 19.

Figure 17:
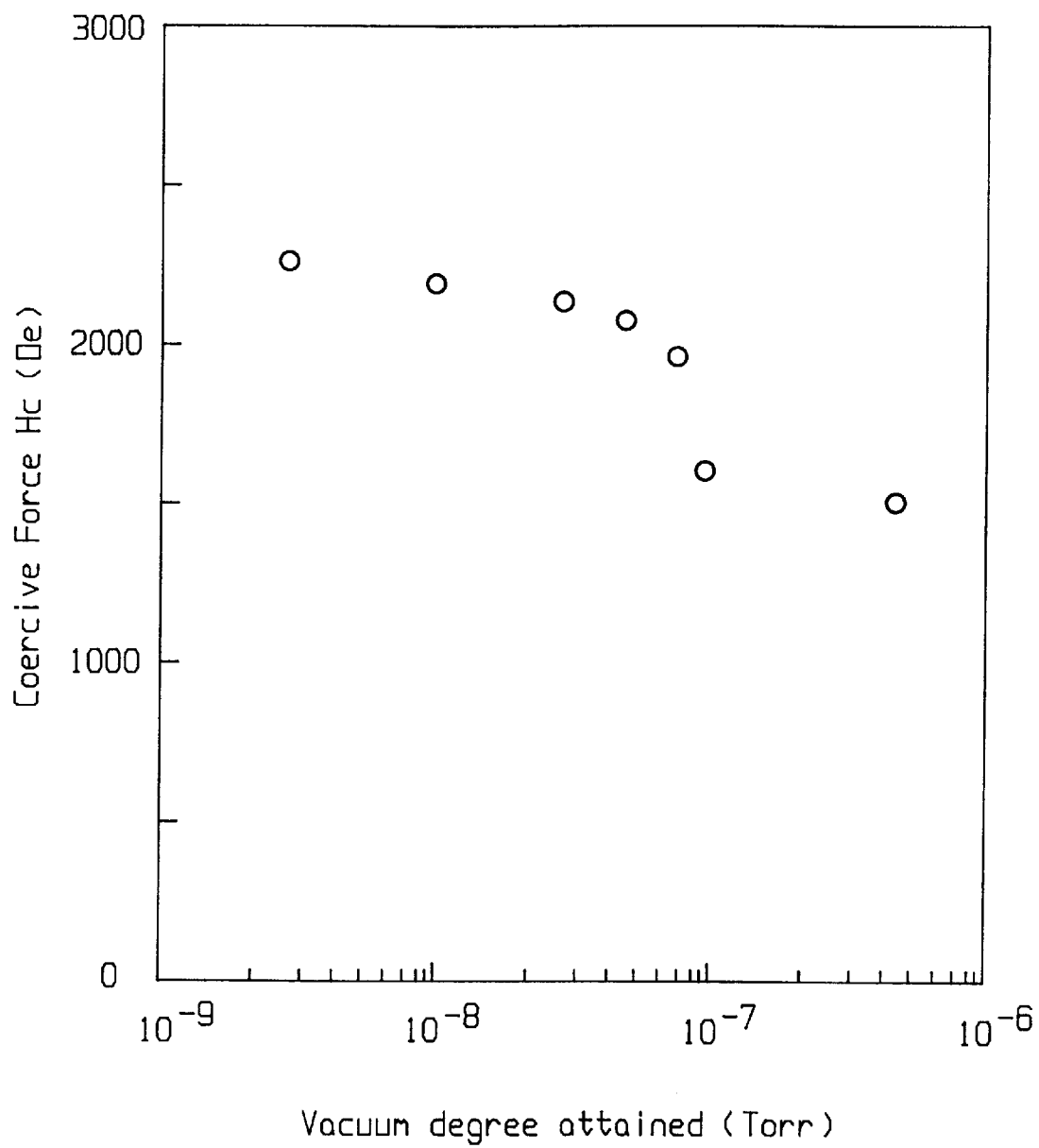
FIG. 17 is a graph showing the relationship between the vacuum degree attained in the film formation chambers in which a metallic base layer and a ferromagnetic metallic layer in accordance with Embodiment 14 are formed, and the coercive force of the medium produced.

In FIG. 17, the relationship between the attained vacuum degree in the film formation chambers used for the formation of the metallic base layer and ferromagnetic metallic layer, and the coercive force of the media produced, is shown. The vertical axis indicates the values of the coercive force of the disc shaped base bodies in the circumferential direction.

As shown in FIG. 17, when the attained vacuum degree was $8 \times 10^{-8}$ Torr or less, the coercive force increased dramatically. Furthermore, at levels of $5 \times 10^{-8}$ Torr or less, a high coercive force of 2000 Oe or more was obtainable, so that this is further preferable.

Furthermore, it was separately confirmed that even when only either the attained vacuum degree in the film formation chamber used for formation of the metallic base layer or that in the film formation chamber used for the ferromagnetic metallic layer was $8 \times 10^{-8}$ Torr or less, the coercive force increased.

(Embodiment 15)

In the present Embodiment, the effects of maintaining the surface temperature of the base body during the formation of the metallic base layer and/or the ferromagnetic metallic layer within a range of 60° C.–150° C. will be discussed. In order to confirm these effects, the surface temperature of the base body during the formation of the metallic base layer and the ferromagnetic metallic layer was varied within a range of 25° C.–250° C., and film formation was conducted. At this time, the impurity concentration in the Cr target used to form the metallic base layer was 120 ppm, and the impurity concentration in the CoNiCr target used to form the ferromagnetic metallic layer was 20 ppm. Furthermore, the impurity concentration in the Ar gas used during the formation of the metallic base layer and the ferromagnetic metallic layer was 1.5 ppb. A textured Ni—P/Al substrate having a surface roughness Ra of 0.7 nm was used as the base body.

Other points were identical to those in Embodiment 19.

Figure 18:
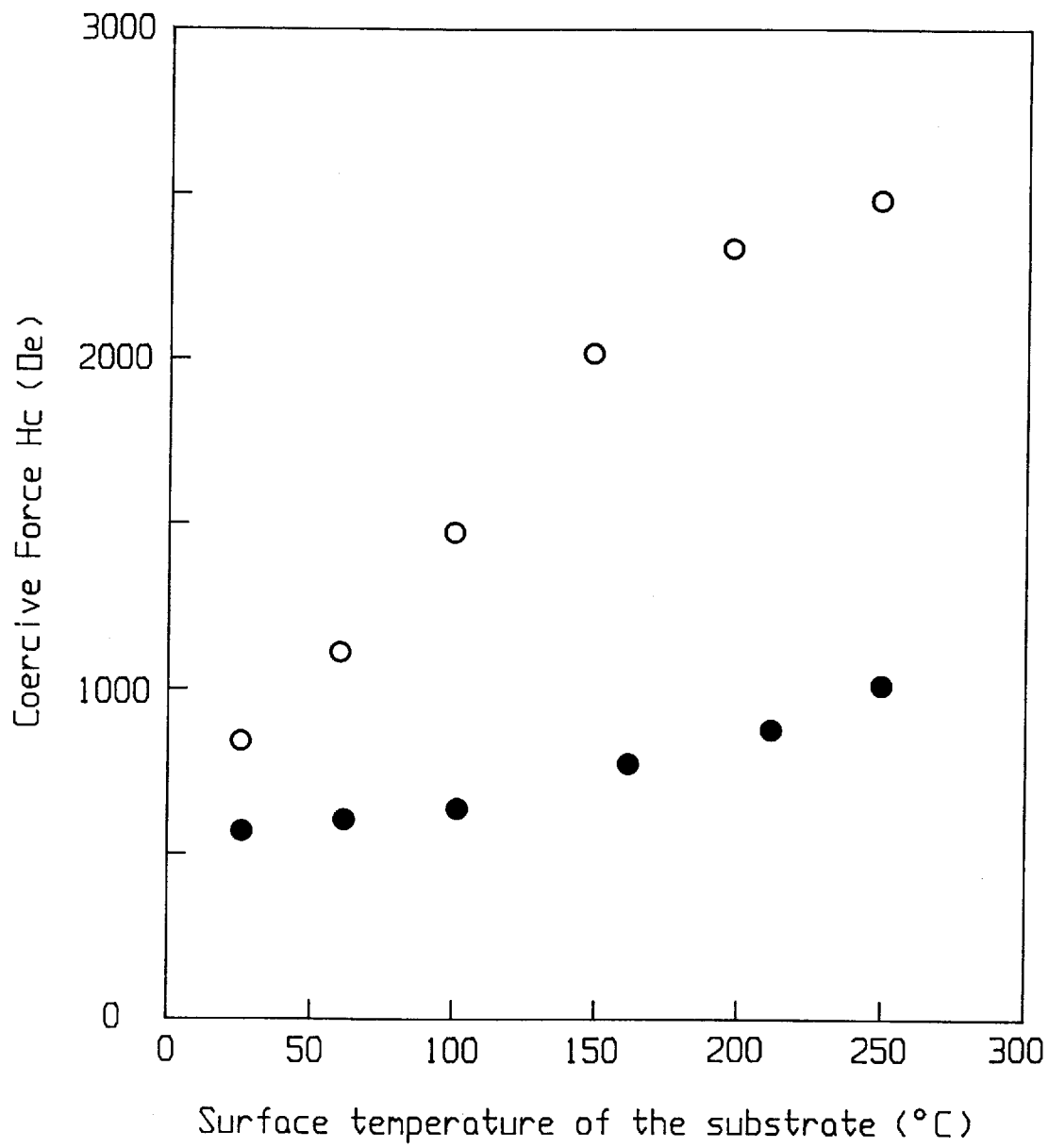
FIG. 18 is a graph showing the relationship between the surface temperature of the base body during the formation of a base metallic layer and/or a ferromagnetic metallic layer in accordance with Embodiment 15, and the coercive force of the medium produced.

In FIG. 18, the relationship between the surface temperature of the base body during the formation of the metallic base layer and/or ferromagnetic metallic layer, and the coercive force of the media produced, is shown. The vertical axis indicates the values of the coercive force of the disc shaped base bodies in the circumferential direction, using white circles. Furthermore, as comparative examples, the coercive forces in the case in which the impurity concentration of the Ar gas used during the formation of the metallic base layer and ferromagnetic metallic layer was 20 ppb are shown using black circles.

Figure 19:
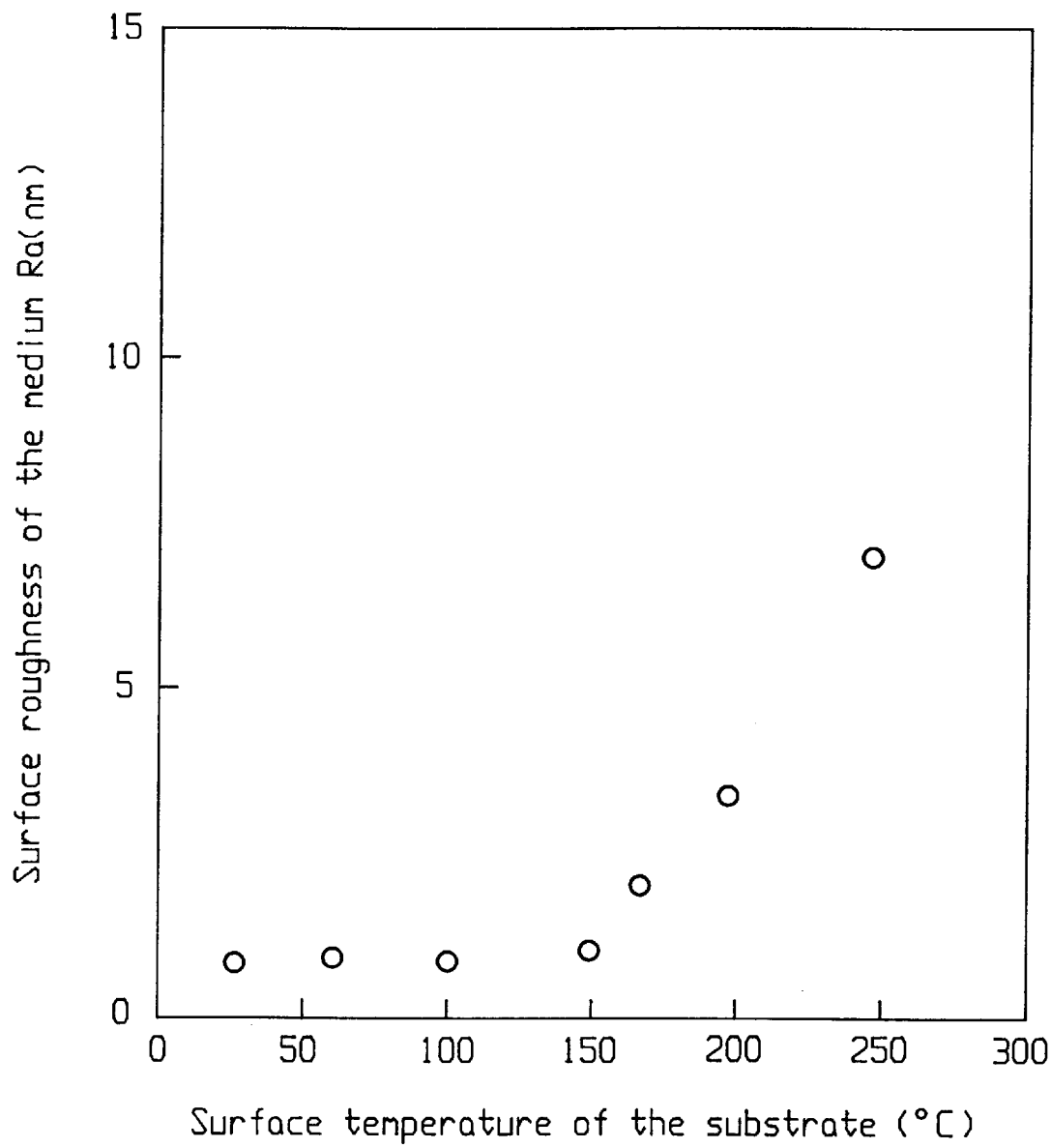
FIG. 19 is a graph showing the relationship between the surface temperature of the base body during the formation of a metallic base layer and/or a ferromagnetic metallic layer in accordance with Embodiment 15, and the surface roughness Ra of the medium produced.

FIG. 19 shows the relationship between the surface temperature of the base body during the formation of the metallic base layer and/or ferromagnetic metallic layer and the surface roughness Ra of the media produced.

As shown in FIG. 18, when the surface temperature was set to 60° C. or more, a coercive force higher than that of conventional media was attained. On the other hand, as shown in FIG. 19, at temperatures of 150° C. or more, the surface roughness Ra of the media increased. When an experiment was conducted in which the height at which the magnetic head rode above such base bodies was 15 nm, there were numerous occurrences of a phenomenon in which the magnetic head collided with the surface of the medium, that is to say, there were numerous head crashes. Furthermore, when the surface temperature of the base body during the formation of the metallic base layer or the ferromagnetic metallic layer was set within a range of 60° C.–150° C., no head crashes occurred.

Accordingly, it was determined that in order to simultaneously realize higher coercive forces than those conventionally obtainable and a low magnetic head height of 15 nm or less, it was necessary to set the surface temperature of the base body during the formation of the metallic base layer and/or ferromagnetic metallic layer to within a range of 60° C.–150° C.

Furthermore, since it is possible to produce media at low temperatures at which high coercive forces were conventionally unobtainable, base bodies which could not be used because gas was released from the base bodies as a result of heating, such as ceramics, plastics, resins, and the like, can be employed.

In the above embodiments, a Ni—P/Al substrate was used as the base bodies; however, it was confirmed that the present invention was also effective when a non-magnetic layer was provided on the surface of the base body, for example when a glass substrate having Ti, C, or the like formed thereon was employed.

(Embodiment 16)

In the present Embodiment, the effects of limiting the surface roughness Ra of the base body to a level of 3 nm or less, or a level of 1 nm or less, will be discussed. In order to confirm these effects, the surface roughness was varied within a range of 0.5 nm–7 nm, and film formation was conducted. At this time, the impurity concentration of the Cr target used for forming the metallic base layer was 120 ppm, and the impurity concentration of the CoNiCr target used for forming the ferromagnetic metallic layer was 20 ppm. Furthermore, the impurity concentration of the Ar gas used during the formation of the metallic base layer and the ferromagnetic metallic layer was 1.5 ppb.

Other points were identical to those in Embodiment 19.

Figure 20:
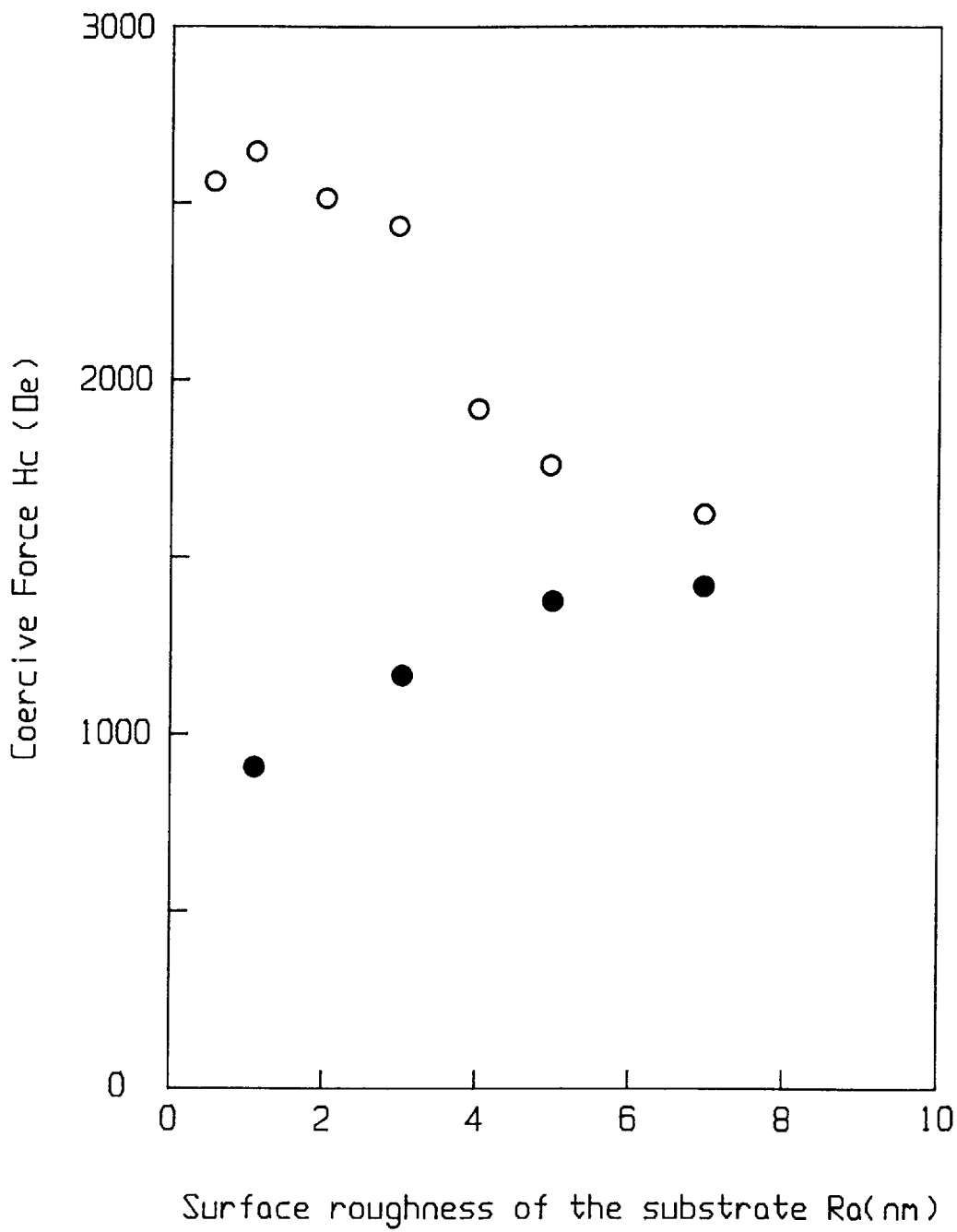
FIG. 20 is a graph showing the relationship between the surface roughness Ra of a base body in accordance with Embodiment 16, and the coercive force of the medium produced.

In FIG. 20, the relationship between the surface roughness Ra of the base body and the coercive force of the media produced is shown. The vertical axis indicates the coercive force values of the disc shaped base bodies in the circumferential direction using white circles. Furthermore, as a conventional example, the coercive forces obtained in the case in which the impurity concentration of the Ar gas used during the formation of the metallic base layer and the ferromagnetic metallic layers was 20 ppb are also indicated by black circles.

As shown in FIG. 20, by limiting the surface roughness Ra of the base body to 3 nm or less, a 30% increase in coercive force was obtained. Furthermore, when Ra was 1 nm or less, a further increase in coercive force was obtained, so that this was more preferable. On the other hand, in the conventional medium, when Ra decreased, there was a precipitous decline in coercive force.

Accordingly, in the present Embodiment, it is possible to simultaneously achieve a small Ra value which permits the realization of a low magnetic head height, and a high coercive force, so that a medium can be obtained which is suitable for application to high recording densities.

(Embodiment 17)

In the present Embodiment, the effects of employing $(Ar+N_2)$ or $(Ar+H_2)$ gas in place of Ar as the gas which is used during the formation of the metallic base layer and/or the ferromagnetic metallic layer will be discussed. At this time, the impurity concentration of the Cr target used for forming the metallic base layer was 120 ppm, and the impurity concentration of the CoNiCr target used for forming the ferromagnetic metallic layer was 20 ppm. Furthermore, the impurity concentration of the Ar gas used during the formation of the metallic base layer and the ferromagnetic metallic layer was 1.5 ppb.

Other points were identical to those in Embodiment 19.

Figure 21:
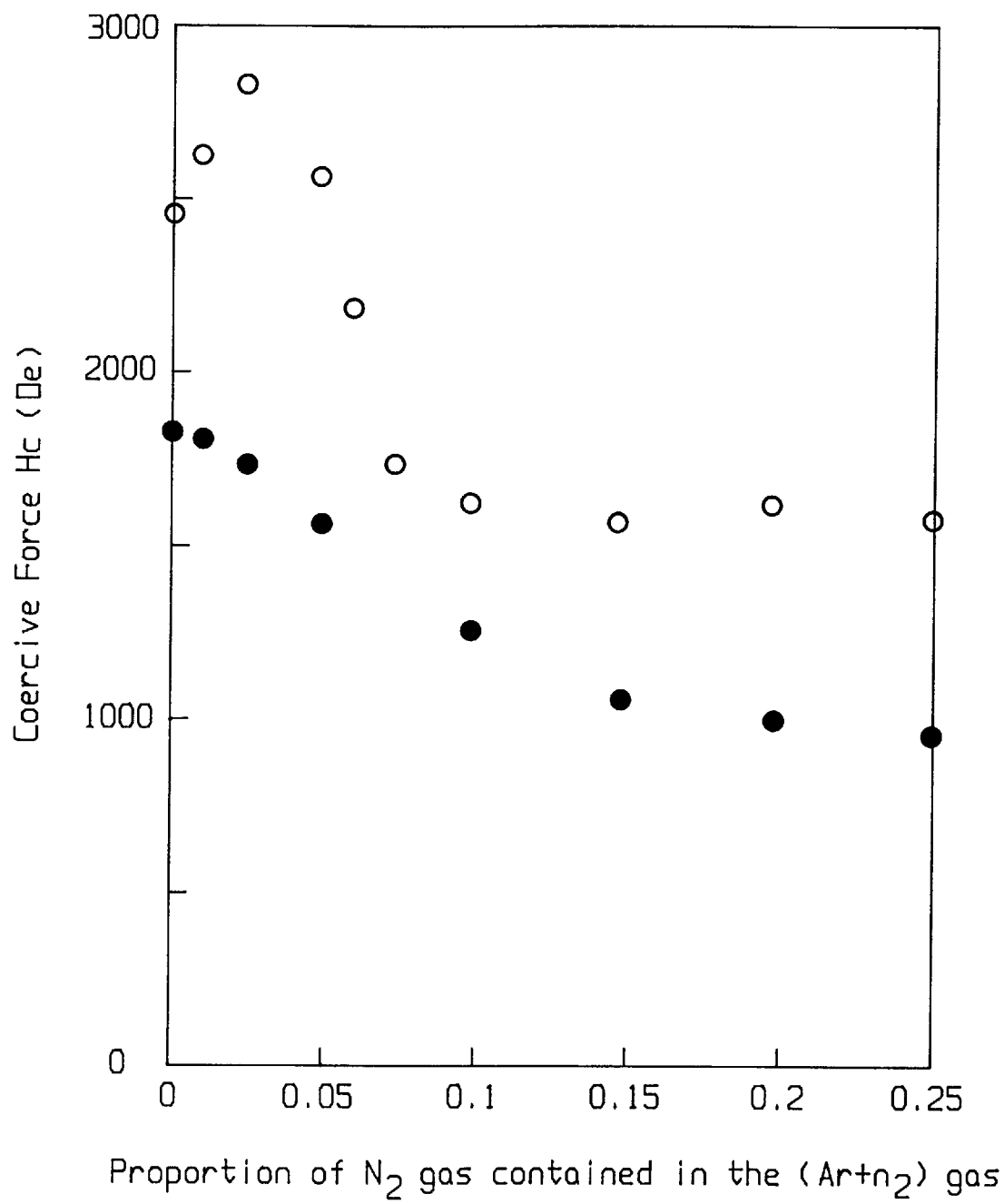
FIG. 21 is a graph showing the relationship between the proportion of the $N_2$ gas in the ($Ar+N_2$) gas in accordance with Embodiment 17 and the coercive force of the medium produced.
Figure 22:
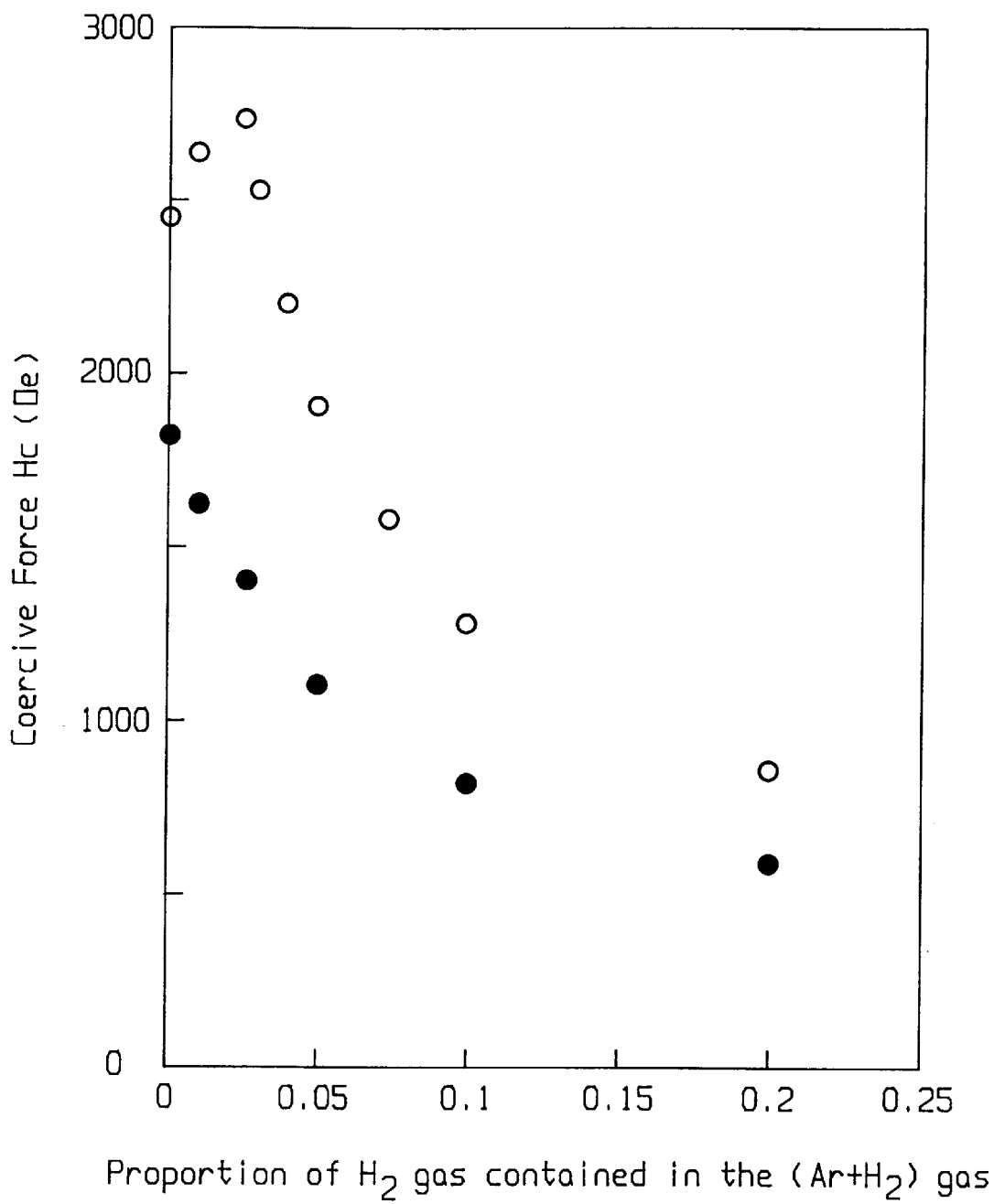
FIG. 22 is a graph showing the relationship between the proportion of $H_2$ gas in the $(Ar+H_2)$ gas in accordance with Embodiment 17 and the coercive force of the medium produced.
Figure 23A:
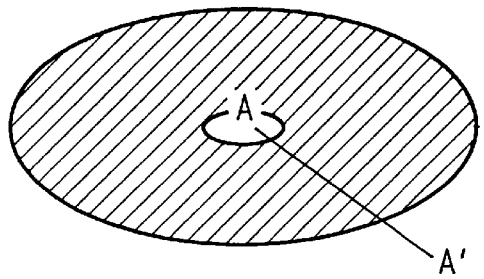
FIG. 23 is a schematic view showing a magnetic recording medium.
Figure 23B:
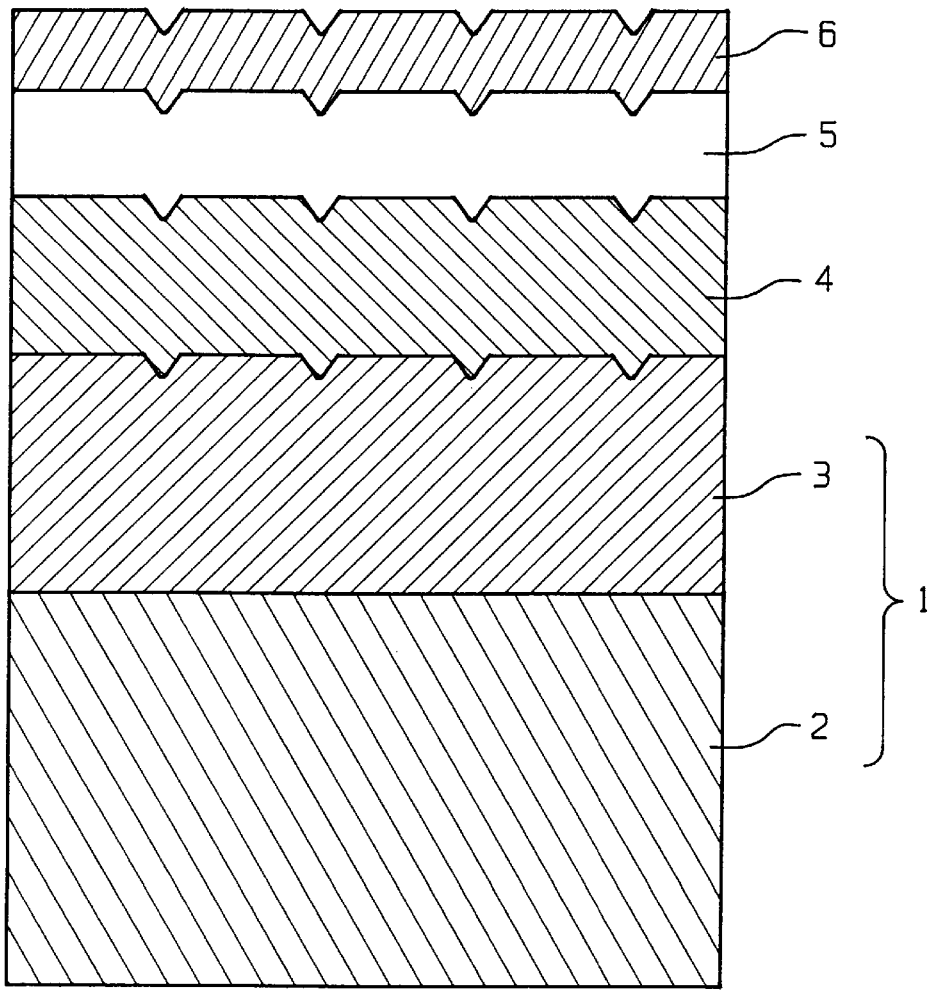

In FIG. 21, the relationship between the proportion of $N_2$ gas in the $(Ar+N_2)$ gas and the coercive force of the media produced is shown by white circles. In FIG. 22, the relationship between the proportion of $N_2$ gas in the $(Ar+H_2)$ gas and the coercive force of the media produced is shown by white circles. Furthermore, as a comparative example, identical evaluations were performed with respect to conventional media (in which the oxygen concentration in the CoNiCr layer and the oxygen concentration in the Cr layer were both 260 wtppm). The results thereof are shown by the black circles in FIGS. 21 and 22.

As shown in FIG. 21, when the proportion of $N_2$ gas in the $(Ar+N_2)$ gas was 0.05 or less, a higher coercive force was obtained than when Ar gas alone was used. Furthermore, as shown in FIG. 22, when the proportion of $H_2$ gas in the $(Ar+H_2)$ gas was 0.03 or less, a higher coercive force was obtained than when Ar gas alone was used.

Accordingly, by using a mixture of at least one of $N_2$ gas and $H_2$ gas with Ar gas as the gas used during the formation of the metallic base layer and/or ferromagnetic metallic layer, it is possible to realize a medium having a high coercive force which is applicable to high recording densities.

Industrial Applicability

By means of the magnetic recording medium in accordance with the present invention, it is possible to realize a high coercive force and low level of medium noise, and it is possible to provide a magnetic recording medium which is applicable to high recording densities.

By means of the manufacturing method for magnetic recording media in accordance with the present invention, the degree of magnetic isolation of the crystalline grains in the ferromagnetic metallic film is increased, and it is possible to increase the coercive force. Furthermore, since the level of medium noise is also reduced, recording and playback characteristics are improved. Furthermore, since it is possible to produce the media using low cost materials in which no Pt is contained in the ferromagnetic metallic film, and by means of processes having high productivity, it is possible to greatly reduce the costs associated with magnetic recording media applicable to high recording densities.

I claim:

1. A magnetic recording medium wherein a ferromagnetic metallic layer is formed on a surface of a base body with a metallic base layer in between, which employs reversal of magnetization, characterized in that an oxygen concentration within crystal grains of said ferromagnetic layer is 100 wtppm or less.

2. A magnetic recording medium wherein a ferromagnetic metallic layer is formed on a surface of a base body with a metallic base layer in between, which employs reversal of magnetization, characterized in that an oxygen concentration within crystal grains of said metallic base layer is 100 wtppm or less.

3. A magnetic recording medium in accordance with claim 2, characterized in that the oxygen concentration in said ferromagnetic metallic layer is 100 wtppm or less.

4. A magnetic recording medium in accordance with claim 1, characterized in that said ferromagnetic metallic layer comprises a Co group alloy.

5. A magnetic recording medium in accordance with claim 4, characterized in that said Co group alloy comprises one selected from a group containing CoNiCr, CoCrTa, CoPtCr, CoPtNi, CoNiCrTa, and CoCrPtTa.

6. A magnetic recording medium in accordance with claim 1, characterized in that said metallic base layer comprises Cr.

7. A magnetic recording medium in accordance with claim 1, characterized in that the thickness of said metallic base layer is within a range of 2.5 nm–100 nm.

8. A magnetic recording medium in accordance with claim 1, characterized in that the thickness of said metallic base layer is within a range of 5 nm–30 nm.

9. A magnetic recording medium in accordance with claim 1, characterized in that the thickness of said ferromagnetic metallic layer is within a range of 2.5 nm–40 nm.

10. A magnetic recording medium in accordance with claim 1, characterized in that the thickness of said ferromagnetic metallic layer is within a range of 5 nm–20 nm.

11. A magnetic recording medium, wherein a ferromagnetic metallic layer is formed on a surface of a base body, which employs reversal of magnetization, characterized in that an oxygen concentration within crystal grains of said ferromagnetic metallic layer is 100 wtppm or less.

12. A magnetic recording medium in accordance with claim 11, characterized in that said ferromagnetic metallic layer comprises a Co group alloy.

13. A magnetic recording medium in accordance with claim 12, characterized in that said Co group alloy is selected from a group containing CoCr, CoCrTa, and CoPt.

14. A magnetic recording medium in accordance with claim 1, characterized in that a non-metallic layer is formed on the surface of said base body.

15. A magnetic recording medium in accordance with claim 1, characterized in that a normalized coercive force, expressed by $Hc/Hk^{grain}$, of said ferromagnetic metallic layer is greater than or equal to 0.3 and less than 0.5.

16. A magnetic recording medium in accordance with claim 1, characterized in that said base body comprises Al alloy.

17. A magnetic recording medium in accordance with claim 1, characterized in that said base body comprises glass.

18. A magnetic recording medium in accordance with claim 1, characterized in that said base body comprises silicon.

19. A manufacturing method for magnetic recording media, wherein a metallic base layer and a ferromagnetic metallic layer are successively formed on a surface of a base body by a sputtering method, characterized in that Ar gas used in film formation has an impurity concentration of 10 ppb or less.

20. A manufacturing method for magnetic recording media in accordance with claim 19, characterized in that the impurity concentration of said Ar gas used in film formation is 100 ppt or less.

21. A manufacturing method for magnetic recording media in accordance with claim 19, characterized in that, prior to the formation of said metallic base layer, the surface of said base body is subjected to a cleaning process by a high-frequency sputtering method employing Ar gas having an impurity concentration of 10 ppb or less, and the surface of said base body is removed to a depth of 0.2 nm–1 nm.

22. A manufacturing method for magnetic recording media in accordance with claim 19, characterized in that said metallic base layer comprises Cr, and the impurity concentration in a target employed during the formation of said metallic base layer is 150 ppm or less.

23. A manufacturing method for magnetic recording media, wherein a ferromagnetic metallic layer is formed on a surface of a base body by a sputtering method, characterized in that Ar gas used in film formation has an impurity concentration of 10 ppb or less.

24. A manufacturing method for magnetic recording media in accordance with claim 23, characterized in that the impurity concentration of said Ar gas is 100 ppt or less.

25. A manufacturing method for magnetic recording media in accordance with claim 23, characterized in that, prior to the formation of said ferromagnetic metallic layer, the surface of said base body is subjected to a cleaning process by means of a high frequency sputtering method, and the surface of said base body is removed to a depth of 0.2 nm–1 nm.

26. A manufacturing method for magnetic recording media in accordance with claim 19, characterized in that the impurity concentration of a target used in the formation of said ferromagnetic metallic layer is 30 ppm or less.

27. A manufacturing method for magnetic recording media in accordance with claim 19, characterized in that during the formation of said metallic base layer and/or ferromagnetic metallic layer, a negative bias is applied to said base body.

28. A manufacturing method for magnetic recording media in accordance with claim 19, characterized in that said negative bias is within a range of −100V−−400V.

29. A manufacturing method for magnetic recording media in accordance with claim 19, characterized in that the attained vacuum degree in film formation chambers used for forming said metallic base layer and/or ferromagnetic metallic layer is $8 \times 10^{-8}$ Torr or less.

30. A manufacturing method for magnetic recording media in accordance with claim 19, characterized in that the surface temperature of said base body during formation of said metallic base layer and/or ferromagnetic metallic layer is within a range of 60° C.–150° C.

31. A manufacturing method for magnetic recording media in accordance with claim 19, characterized in that said base body has a non-magnetic layer formed on the surface thereof.

32. A manufacturing method for magnetic recording media in accordance with claim 19, characterized in that the surface roughness of said base body is such that Ra is 3 nm or less.

33. A manufacturing method for magnetic recording media in accordance with claim 19, characterized in that the surface roughness of said base body is such that Ra is 1 nm or less.

34. A manufacturing method for magnetic recording media in accordance with claim 19, characterized in that a gas used during formation of said metallic base layer and/or ferromagnetic metallic layer comprises a mixture of at least one of $N_2$ gas and $H_2$ gas with Ar gas.

* * * * *